(12) United States Patent
Hayashi et al.

(10) Patent No.: US 7,786,688 B2
(45) Date of Patent: Aug. 31, 2010

(54) MOTOR DRIVE CIRCUIT

(75) Inventors: Hiroaki Hayashi, Kyoyo (JP);
Toshikazu Satake, Kyoto (JP)

(73) Assignee: Rohm Co., Ltd. (JP)

( * ) Notice: Subject to any disclaimer, the term of this patent is extended or adjusted under 35 U.S.C. 154(b) by 90 days.

(21) Appl. No.: 12/095,989

(22) PCT Filed: Dec. 4, 2006

(86) PCT No.: PCT/JP2006/324190

§ 371 (c)(1),
(2), (4) Date: Jun. 3, 2008

(87) PCT Pub. No.: WO2007/066625

PCT Pub. Date: Jun. 14, 2007

(65) Prior Publication Data

US 2009/0045762 A1    Feb. 19, 2009

(30) Foreign Application Priority Data

Dec. 6, 2005   (JP) .............................. 2005-352718
Dec. 15, 2005  (JP) .............................. 2005-362478

(51) Int. Cl.
    *H02P 6/00* (2006.01)
(52) U.S. Cl. .............................. 318/400.29; 318/400.3; 318/400.26
(58) Field of Classification Search ............ 318/400.29, 318/400.3, 400.26, 484, 430, 379, 504; 327/424
    See application file for complete search history.

(56) References Cited

U.S. PATENT DOCUMENTS

2009/0066280 A1*  3/2009  Hayashi ...................... 318/430

FOREIGN PATENT DOCUMENTS

| JP | 6-98574 | 4/1994 |
|---|---|---|
| JP | 7-23589 | 1/1995 |
| JP | 7-31190 | 1/1995 |
| JP | 7-95792 | 4/1995 |
| JP | 2001-45790 | 2/2001 |
| JP | 2001-284868 | 10/2001 |
| JP | 2002-199785 | 7/2002 |
| JP | 2004-153955 | 5/2004 |
| JP | 2004-208442 | 7/2004 |
| JP | 2005-80492 | 3/2005 |
| JP | 2005-82968 | 3/2005 |

OTHER PUBLICATIONS

International Search Report for International Application No. PCT/JP2006/324190 mailed Mar. 6, 2007 with English translation.

(Continued)

*Primary Examiner*—Karen Masih
(74) *Attorney, Agent, or Firm*—Cantor Colburn LLP

(57) ABSTRACT

A drive signal generation circuit generates drive signals that control ON and OFF states of transistors of a H-bridge circuit, in accordance with a target value of torque. A driver circuit alternatively turns ON and OFF high side transistors, and low side transistors of the H-bridge circuit, based on the drive signals outputted from the drive signal generation circuit. The driver circuit immediately turns OFF the high side transistors, when an instruction is issued to stop a motor, and after a predetermined delay time τd has elapsed, turns OFF the low side transistors.

25 Claims, 14 Drawing Sheets

OTHER PUBLICATIONS

International Preliminary Report on Patentability for International Application No. PCT/JP2006/324190 mailed Mar. 6, 2007 with English translation.

Office Action for Chinese Patent Application No. 200680021535.0 issued Aug. 14, 2009 with English translation.

* cited by examiner

FIG.2A Sstop
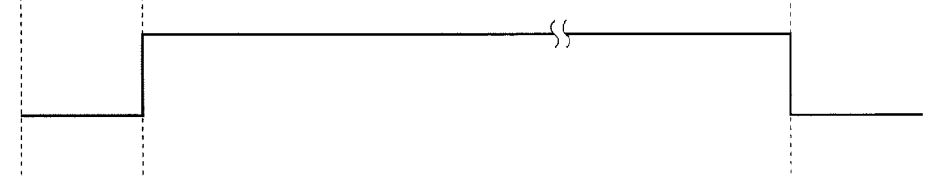
FIG.2B ST1
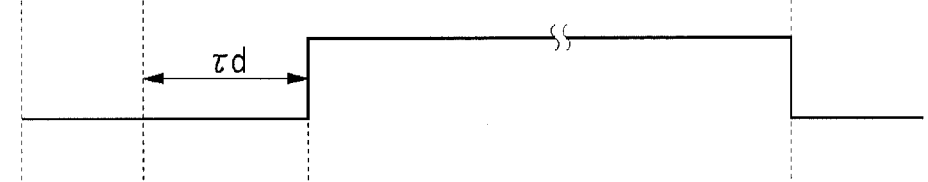
FIG.2C ST2
FIG.2D SDH'
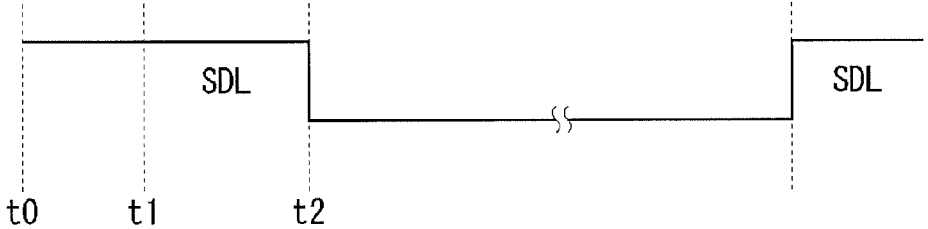
FIG.2E SDL'

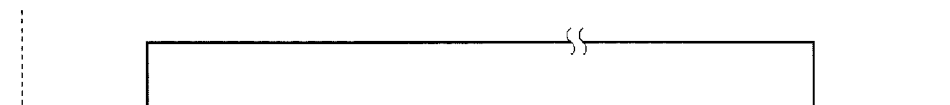
FIG.5A Sstop
FIG.5B ST1
FIG.5C ST2
FIG.5D SDH'
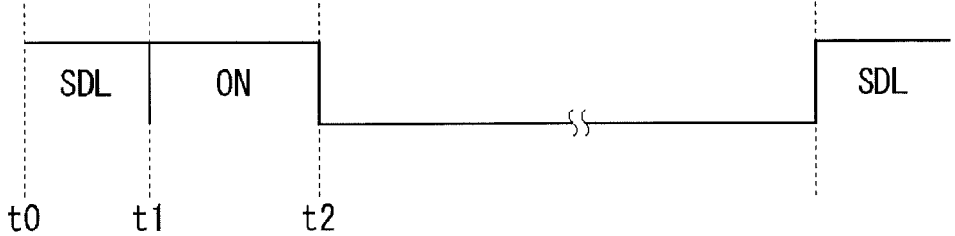
FIG.5E SDL'

MOTOR DRIVE CIRCUIT

CROSS REFERENCE TO RELATED APPLICATIONS

This is a U.S. national stage of application No. PCT/JP2006/324190, filed on 4 Dec. 2006. Priority under 35 U.S.C. §119(a) and 35 U.S.C. §365(b) is claimed from Japanese Application No. 2005-352718, filed 6 Dec. 2005 and Japanese Application No. 2005-362478, filed 15 Dec. 2005, the disclosures of which is also incorporated herein by reference.

BACKGROUND OF THE INVENTION

1. Field of the Invention

The present invention relates to motor drive technology.

2. Description of the Related Art

1. In recent years, with the speeding up of personal computers and workstations, operating speeds of LSIs (Large Scale Integrated circuits) for processing in CPUs (Central Processor Units), DSPs (Digital Signal Processors), and the like, have been increasing.

In such LSIs, as the operating speeds, that is, clock frequencies, become higher, amounts of heat generated become large. There is a problem in that the generated heat from an LSI leads to thermorunaway in the LSI itself, or impacts on neighboring circuits. Therefore, appropriate heat cooling of the LSIs has become a very important technology.

As an example of technology for cooling the LSI, there is a cooling method comprising an air-cooling system by a cooling fan. In this method, for example, the cooling fan is installed facing a surface of the LSI, and cool air is blown on the LSI surface by the cooling fan. When the LSI is cooled by this type of cooling fan, temperature in the vicinity of the LSI is monitored, and the cooling level is adjusted by changing rotations of the fan in accordance with the temperature (Patent Documents 1 and 2). Furthermore, Patent Document 3 discloses technology in which a duty ratio of a pulse-width modulated signal is limited, so that a fan motor rotates at or above a predetermined minimum number of rotations.

2. Technology is widely used for controlling a conduction time of a coil of a motor, by a pulse signal such as a pulse-width modulation signal or the like, in order to rotate a single phase motor or a polyphase motor at a desired torque.

When starting driving of a stopped motor, when a switching voltage, which has a pulse width corresponding to a target torque, is suddenly applied to the motor coil, a current flows rapidly in the motor coil. At startup of the motor, particularly when the number of rotations thereof is close to 0, since there is no power generation capability, the current flowing in the coil has a value of applied voltage divided by winding resistance. The resistance value of the coil is designed to be very low, in order to reduce power losses, and there are cases in which the coil current exceeds a rating of a drive circuit or the coil itself, and has an effect on reliability of the circuit.

Furthermore, back electromotive force (back electromotive voltage) that occurs in the coil is proportional to time variation rate of the current flowing in the coil. Therefore, as described above, when the coil current rapidly increases, a very large back electromotive voltage occurs, and there is a risk of the rating of the drive circuit being exceeded.

For this reason, immediately after initiating startup of the motor, soft start control is performed to gradually increase the current flowing in the coil (for example, refer to Patent Documents 1 and 2). In the soft start control described in Patent Document 1, a soft start voltage, in which the voltage value is gradually increased with time, is generated; this soft start voltage is compared to a cyclic voltage of a triangular waveform or a sawtooth waveform; a pulse-modulation signal whose duty ratio gradually increases is generated; and conduction time of the coil is gradually increased, to perform the soft start.

Patent Document 1: Japanese Patent Application, Laid Open No. H07-31190

Patent Document 2: Japanese Patent Application, Laid Open No. 2001-284868

Patent Document 3: Japanese Patent Application, Laid Open No. 2004-153955

Patent Document 4: Japanese Patent Application, Laid Open No. H06-98574

Patent Document 5: Japanese Patent Application, Laid Open No. H07-95792

Patent Document 6: Japanese Patent Application, Laid Open No. 2001-45790

1. There has been a problem in that, when a rotating motor is stopped, a regenerative current flows in a coil, and this regenerative current flows towards a power supply. Cases are envisioned in which back electromotive voltage generated at this time exceeds withstanding voltage of a transistor device or the like. This problem occurs not only with driving a fan motor, but also with driving other motors.

Patent Document 4 discloses technology in which a thyristor is arranged in parallel with a motor that is to be driven, and regenerative control is performed. However, in the technology described in Patent Document 4, a bridge circuit is configured of a plurality of transistors, and the technology cannot be used when the plural transistors are driven, being alternately turned ON and OFF, (for example, a H-bridge circuit or the like of Patent Document 3).

In a motor drive circuit using the H-bridge circuit or the like, in order to protect the circuit from back electromotive voltage that occurs when the motor is stopped, a method is adopted in which a capacitor is arranged between a power supply voltage terminal and ground, or a zener diode is provided, and an escape path for the regenerative current is formed, and the back electromotive voltage is clamped. However, there has been a problem in that addition of the capacitor or the zener diode leads to an increase in circuit area and cost.

2. Furthermore, in soft start control described in Patent Documents 4 and 5, there is also a problem in that conduction time of the motor can only be increased monotonically.

SUMMARY OF THE INVENTION

1. The present invention was made in view of these issues, and one general purpose of an embodiment thereof is to curtail generation of back electromotive voltage when a motor is stopped, in a motor drive circuit that drives the motor by a bridge configuration.

2. Furthermore, a general purpose of an embodiment of the present invention is the provision of a motor drive circuit in which soft start control with a high degree of freedom can be realized.

1. An embodiment of the present invention relates to a motor drive circuit which supplies a drive signal to an output stage including at least two pairs of transistors, wherein a transistor pair includes a high side transistor and a low side transistor connected in series between a power supply voltage terminal and a ground terminal, and which supplies a switching voltage to a coil of a motor that is to be driven. This motor drive circuit is provided with a drive signal generation circuit which generates a drive signal that controls ON and OFF states of the output stage transistors in accordance with a target value of torque of the motor, and a driver circuit which alternately turns ON and OFF the high side transistors and the low side transistors of the output stage, based on the drive signal outputted from the drive signal generation circuit. When an instruction is issued to stop the motor, the driver circuit immediately turns OFF one of either the high side transistors or the low side transistors of the transistor pairs, and, after a predetermined delay time has elapsed, turns OFF the other of either the high side transistors or the low side transistors of the transistor pairs.

According to this embodiment, since a regenerative current can be made to flow in a loop made up of the high side transistors or in a loop made up of the low side transistors during the delay time, generation of the back electromotive voltage can be curtailed.

The driver circuit may control, based on the drive signal, the other of either the high side transistors or the low side transistors, during the delay time.

In such cases, during the delay time, the regenerative current flows via a body diode of a MOSFET (Metal Oxide Semiconductor Field Effect Transistor), or a separately provided flywheel diode.

The driver circuit may forcibly turn ON the other of either the high side transistors or the low side transistors, during the delay time.

In such cases, since the high side transistors or the low side transistors are ON during the delay time, the regenerative current flows in a transistor channel with a low resistance value, and power consumption of the circuit can be reduced.

The driver circuit may include a timing signal generation circuit, which receives a stop signal that issues an instruction to stop the motor, and which outputs a first timing signal and a second timing signal, of predetermined levels, at different timing shifted by the delay time, a first combining circuit which is arranged on a path of a high side drive signal supplied from the drive signal generation circuit to the high side transistors, which logically combines the high side drive signal with the first timing signal, and which forcibly turns OFF the high side transistors in a time period in which the first timing signal has a predetermined level, and a second combining circuit which is arranged on a path of a low side drive signal supplied from the drive signal generation circuit to the low side transistors, which logically combines the low side drive signal with the second timing signal, and which forcibly turns OFF the low side transistors, in a time period in which the second timing signal has a predetermined level.

The timing signal generation circuit, after the delay time has elapsed from the first timing signal being put at the predetermined level, may put the second timing signal to the predetermined level, and the second combining circuit may perform driving, during the delay time, of the low side transistors based on the low side drive signal.

The timing signal generation circuit, after the delay time has elapsed from the second timing signal being put at the predetermined level, may put the first timing signal to the predetermined level, and the first combining circuit may perform driving, during the delay time, of the high side transistors based on the high side drive signal.

The timing signal generation circuit, after the delay time has elapsed from the first timing signal being put at the predetermined level, may put the second timing signal to the predetermined level, and the second combining circuit may forcibly turn ON the low side transistors, during the delay time.

The timing signal generation circuit, after the delay time has elapsed from the second timing signal being put at the predetermined level, may put the first timing signal to the predetermined level, and the first combining circuit may forcibly turn ON the high side transistors, during the delay time.

A stop signal generation circuit may be further provided, which monitors the state of the motor, and generates a stop signal, which has a predetermined level when a predetermined condition is fulfilled, instructing the motor to stop.

The stop signal generation circuit may monitor temperature of the motor, and when the temperature deviates from a predetermined temperature range, may put the stop signal at the predetermined level. The stop signal generation circuit may monitor a rotation state of the motor, and when rotation is not possible, may put the stop signal at the predetermined level. The stop signal generation circuit may detect current flowing in the coil of the motor, and when the detected current exceeds a predetermined value, may put the stop signal at the predetermined level.

The motor drive circuit may be integrated as a unit on one semiconductor substrate. "Integrated" includes cases in which all component elements of the circuit are formed on the semiconductor substrate, and cases in which main component elements of the circuit are integrated, and some resistors, capacitors, or the like, for adjusting a circuit constant, may be arranged outside the semiconductor substrate. By integrating the motor drive circuit as one LSI, it is possible to reduce circuit area.

Another embodiment of the present invention is a cooling device. The cooling device is provided with a fan motor, and the abovementioned motor drive circuit which drives the fan motor.

A further embodiment of the present invention is an electronic device. The electronic device is provided with the abovementioned cooling device. According to this embodiment, it is possible to appropriately cool, according to temperature, an object to be cooled, inside the electronic device.

An even further embodiment of the present invention is a motor drive method of supplying a drive signal to an output stage including at least two pairs of transistors, wherein a transistor pair includes a high side transistor and a low side transistor connected in series between a power supply voltage terminal and a ground terminal, and of supplying a switching voltage to a coil of a motor that is to be driven. This motor drive method includes a step of generating a drive signal which controls ON and OFF states of the output stage transistors in accordance with a target value of torque of the motor, a step of alternately turning ON and OFF the high side transistors and the low side transistors of the output stage, based on the generated drive signal, a step of generating a stop signal which issues an instruction to stop the motor, and a step of immediately turning off one of either the high side transistors or the low side transistors of the transistor pairs, when an instruction is issued to stop the motor, and, after a predetermined delay time has elapsed, turning OFF the other of either the high side transistors or the low side transistors of the transistor pairs.

2. An embodiment of the present invention relates to a motor drive circuit which generates a pulse-modulated drive signal that defines conduction time of a coil of a motor that is to be driven, and controls the number of rotations of the motor. The motor drive circuit is provided with a time constant circuit which, when the motor is started up, generates a first startup control voltage in which voltage value changes with time, an amplifier which amplifies the first startup control voltage outputted from the time constant circuit, and outputs the amplified voltage as a second startup control voltage, and a drive signal generation circuit which combines rotation control voltage, set according to a target value of the torque of the motor, with the first and the second startup control voltages, and generates a pulse-modulated drive signal that has a duty ratio corresponding to any of the three voltages.

According to this embodiment, by combining the three voltages, which are the first and the second control voltages, and the rotation control voltage, it is possible to set duty ratios of various pulse-modulated drive signals in various ways, and it is possible to improve degrees of freedom of rotation control when the motor is started up. Furthermore, in the present specification, "amplification" includes attenuation with gain of less than 1, and "amplifier" includes an attenuator. The amplifier may be a variable gain amplifier.

Furthermore, the amplifier may be an inverting amplifier which performs inverting amplification of the first startup control voltage, and may be a noninverting amplifier which performs noninverting amplification of the first startup control voltage. By controlling gain of the amplifier, it is possible to freely perform rotation control when the motor is started up.

The drive signal generation circuit may include a pulse-modulation comparator which generates a pulse-modulation signal by comparing the rotation control voltage with a predetermined cyclic voltage, a first comparator which generates a first control pulse signal by comparing the first startup control voltage with the cyclic voltage, a second comparator which generates a second control pulse signal by comparing the second startup control voltage with the cyclic voltage, and a combining circuit which generates the drive signal by combining the pulse-modulation signal with the first and the second control pulse signals by a logical operation.

In the pulse-modulation comparator, the first comparator, and the second comparator, a pulse-modulation signal is generated using a cyclic voltage of a triangular waveform or a sawtooth waveform. Since an output signal of each comparator is a logical signal that takes either a high level or a low level, the output signal is combined by a logical operation, so that it is possible to set a duty ratio of the drive signal to any of the duty ratios of the pulse signals outputted from the three comparators.

The combining circuit may include a first logic block which performs a logical operation on the pulse-modulation signal generated by the pulse-modulation comparator, with the second control pulse signal generated by the second comparator, and a second logic block which combines the first control pulse signal generated by the first comparator with an output signal of the first logic block.

The drive signal generation circuit may include a voltage selection circuit which selects a voltage among any of three voltages, the rotation control voltage, the first and the second control voltage, based on level relationships thereof, and a pulse-width modulation comparator which generates the pulse-modulated drive signal by comparing the voltage outputted from the voltage selection circuit and a predetermined cyclic voltage.

The motor drive circuit may be integrated as a unit on one semiconductor substrate. By integrating the motor drive circuit as one LSI, it is possible to reduce circuit area.

Another embodiment of the present invention is a cooling device. The device is provided with a fan motor, and a motor drive circuit which drives the fan motor.

A further embodiment of the present invention is an electronic device. The electronic device is provided with the abovementioned cooling device. According to this embodiment, it is possible to preferably cool, according to temperature, an object to be cooled, inside the electronic device.

An even further embodiment of the present invention is a motor drive method. This method is a motor drive method which generates a pulse-modulated drive signal that defines conduction time of a coil of a motor that is to be driven, and controls the number of rotations of the motor, the method including a step of generating a first startup control voltage in which voltage value changes with time, when the motor is started up, a step of amplifying the first startup control voltage and outputting the amplified voltage as a second startup control voltage, and a step of combining rotation control voltage, set according to a target value of the torque of the motor, with the first and the second startup control voltages, and generating a pulse-modulated drive signal that has a duty ratio corresponding to any of the three voltages.

It is to be noted that any arbitrary combination or rearrangement of the above-described structural components and so forth is effective as and encompassed by the present embodiments.

Moreover, this summary of the invention does not necessarily describe all necessary features so that the invention may also be a sub-combination of these described features.

BRIEF DESCRIPTION OF THE DRAWINGS

Embodiments will now be described, by way of example only, with reference to the accompanying drawings which are meant to be exemplary, not limiting, and wherein like elements are numbered alike in several Figures, in which:

FIGS. 2A to 2E are time charts showing operation states of a motor drive circuit according to the first embodiment when a motor is stopped;

FIGS. 5A to 5E are time charts showing operation states of a motor drive circuit according to a second embodiment when a motor is stopped;

DETAILED DESCRIPTION OF THE INVENTION

The invention will now be described based on preferred embodiments which do not intend to limit the scope of the present invention but exemplify the invention. All of the features and the combinations thereof described in the embodiment are not necessarily essential to the invention.

First Embodiment

Several embodiments of the present invention relate to a motor drive circuit used in a cooling device for cooling electronic computers, such as desktop or laptop personal computers, workstations, or the like, or electronic devices, such as refrigerators or the like.

Figure 1:
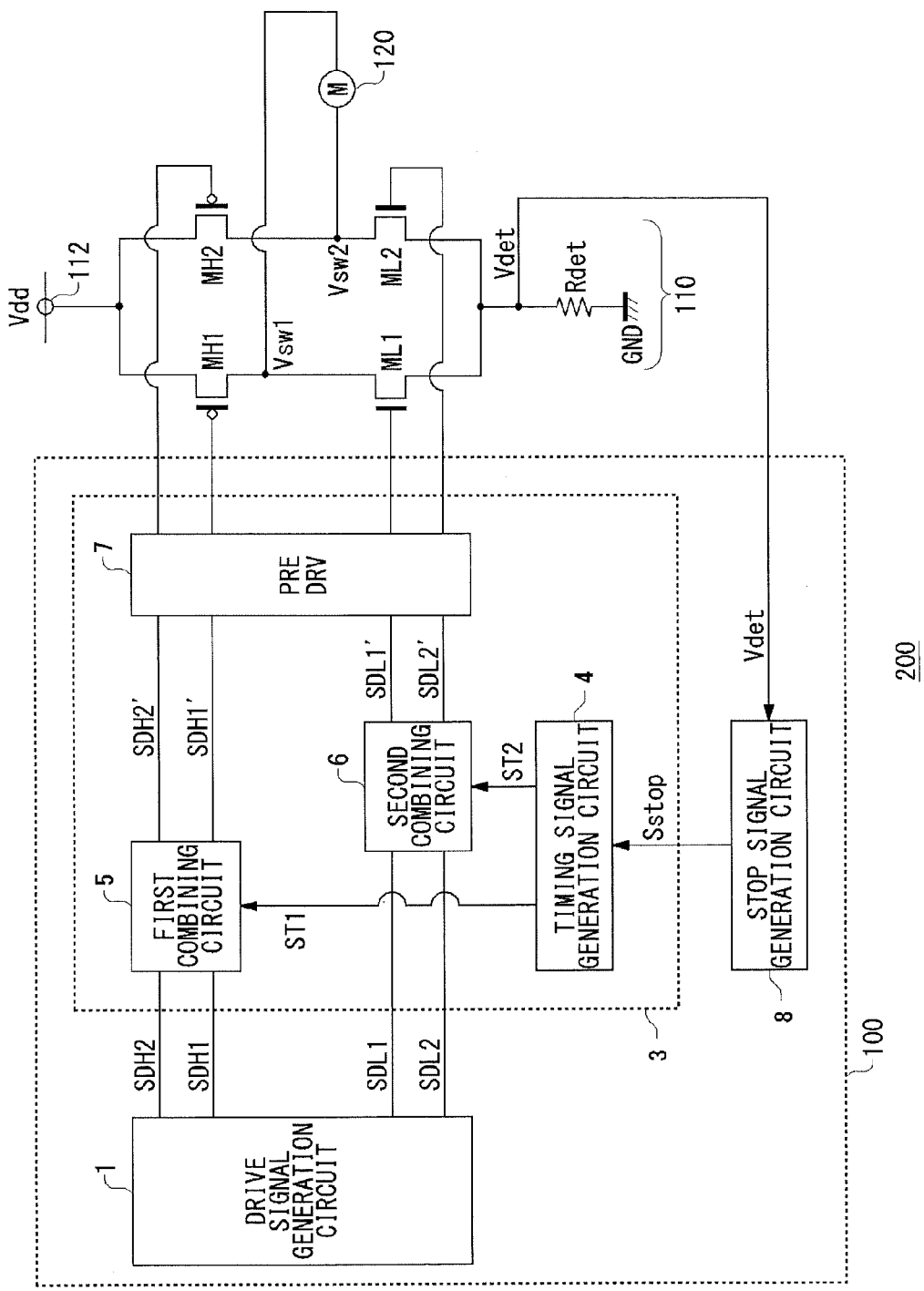
FIG. 1 is a circuit diagram showing a configuration of a cooling device according to a first embodiment.

FIG. 1 is a circuit diagram showing a configuration of a cooling device 200 according to a first embodiment of the present invention. The cooling device 200 includes a motor drive circuit 100, a H-bridge circuit 110, and a fan motor 120.

The fan motor 120 is a single-phase full-wave motor in the present embodiment, and is arranged facing an object to be cooled, which is not shown in the figure. In the fan motor 120, a coil current, that is, a conduction state, is controlled to control rotation, by switching signals Vsw1 and Vsw2 generated by the motor drive circuit 100 and the H-bridge circuit 110.

The H-bridge circuit 110 includes a first high side transistor MH1, a second high side transistor MH2, a first low side transistor ML1, a second low side transistor ML2, and a current detection resistor Rdet. The H-bridge circuit 110 is an output stage for driving the fan motor 120. The first high side transistor MH1 and the first low side transistor ML1 are connected in series between a power supply voltage terminal 112 and a ground terminal GND, and form a transistor pair (referred to below as a first transistor pair). In the same way, the second high side transistor MH2 and the second low side transistor ML2 form a transistor pair (referred to below as a second transistor pair). In the present embodiment, the first high side transistor MH1 and the second high side transistor MH2 are P-channel MOSFETs. Furthermore, the first low side transistor ML1 and the second low side transistor ML2 are N-channel MOSFETs.

The first high side transistor MH1 and the first low side transistor ML1 that form the first transistor pair are alternately and complementarily ON and OFF. The ON and OFF states of the first high side transistor MH1 and the first low side transistor ML1 are controlled by a first high side drive signal SDH1 and a first low side drive signal SDL1, applied to each transistor gate.

Voltage of a connection point of the first high side transistor MH1 and the first low side transistor ML1 is applied to one end of a coil of the fan motor 120, as the first switching signal Vsw1. When the first high side transistor MH1 is ON, the first switching signal Vsw1 is a power supply voltage Vdd, and when the first low side transistor ML1 is ON, the first switching signal Vsw1 is a ground potential (0 V).

The ON and OFF states of the second high side transistor MH2 and the second low side transistor ML2 that form the second transistor pair are controlled by a second high side drive signal SDH2 and a second low side drive signal SDL2, applied to each transistor gate. Voltage of a connection point of the two transistors is applied to the other end of the coil of the fan motor 120, as the second switching signal Vsw2. The second switching signal Vsw2 is controlled so as to have a reverse phase to the first switching signal Vsw1.

The current detection resistor Rdet is arranged between the ground terminal GND and a source of the first low side transistor ML1 and the second low side transistor ML2 that are commonly connected. The current detection resistor Rdet converts current flowing in the coil of the fan motor 120 into voltage (referred to as detection voltage Vdet). The detection voltage Vdet is fed back to the motor drive circuit 100.

Furthermore, the four transistors that form the H-bridge circuit 110 may be integrated as a unit in the motor drive circuit 100. Moreover, a diode to prevent reverse connection may be arranged at a source of the first high side transistor MH1 and the second high side transistor MH2, and a power supply (not shown in the figure) that outputs the power supply voltage Vdd.

The motor drive circuit 100 supplies drive signals SDH1, SDL1, SDH2, and SDL2 to the H-bridge circuit 110 that is the output stage. Linear driving and pulse driving can be used as a driving method of the H-bridge circuit 110, but in the present embodiment it is possible to accommodate any method.

The motor drive circuit 100 is provided with a drive signal generation circuit 1, a driver circuit 3, and a stop signal generation circuit 8, and is a function IC integrated as a unit on one semiconductor substrate.

The drive signal generation circuit 1 generates the drive signals SDH1, SDH2, SDL1, SDL2 which control ON and OFF states of the transistors MH1, MH2, ML1, ML2 of the H-bridge circuit 110, in accordance with a target value of torque of the fan motor 120 and phase transition of a rotor. The drive signal generation circuit 1 may, for example, generate drive signals (referred to below as SD, as necessary) based on a Hall signal outputted from a Hall element not shown in the figure. Furthermore, a pulse-width modulation signal set by a duty ratio, in accordance with the target value of the torque, may be generated, and by combining this pulse-width modulation signal and the Hall signal, the drive signals SD may be generated.

The driver circuit 3 complementarily and alternatively turns ON and OFF the high side transistors MH1 and MH2, and the low side transistors ML1 and ML2 of the H-bridge circuit 110, based on the drive signals SD outputted from the drive signal generation circuit 1.

When an instruction is issued to stop the motor, the driver circuit 3 immediately turns OFF one of either the high side transistors or the low side transistors of the transistor pairs. In the present embodiment, the driver circuit 3 immediately turns OFF the first high side transistor MH1 and the second high side transistor MH2 of the respective first and second transistor pairs.

Furthermore, the driver circuit 3 turns OFF, after a predetermined delay time τd has elapsed, the other of either the high side transistors or the low side transistors of the transistor pairs. In the present embodiment, the driver circuit 3 immediately turns OFF, after the predetermined delay time τd has elapsed, the first low side transistor ML1 and the second low side transistor ML2 of the respective first and second transistor pairs.

Next, an explanation is given concerning a configuration example of the driver circuit 3, based on a block diagram of FIG. 1. In the present embodiment, the driver circuit 3 includes a timing signal generation circuit 4, a first combining circuit 5, a second combining circuit 6, and a pre-driver 7.

The timing signal generation circuit 4 receives a stop signal Sstop that instructs the fan motor 120 to stop, and, at a different timing shifted by only the delay time τd, outputs a first timing signal ST1 and a second timing signal ST2 at a high level. In the present embodiment, the timing signal generation circuit 4 puts the second timing signal ST2 to a high level after the delay time τd has elapsed from when the first timing signal ST1 is put at a high level.

The first combining circuit 5 is arranged on a path of a first high side drive signal SDH1 and a second high side drive signal SDH2, supplied from the drive signal generation circuit 1 to the first high side transistor MH1 and the second high side transistor MH2. The first combining circuit 5 logically combines the high side drive signals SDH1 and SDH2 with the first timing signal ST1, and forcibly turns the high side transistors MH1 and MH2 OFF, in a time period in which the first timing signal ST1 has a high level. The first combining circuit 5 fixes signal levels of the high side drive signals SDH1 and SDH2 to a logical value at which the high side transistors MH1 and MH2 are OFF, in a time period in which the first timing signal ST1 has a high level. The first combining circuit 5 can be configured easily using an AND gate, an OR gate, or the like.

The second combining circuit 6 is arranged on a path of a first low side drive signal SDL1 and a second low side drive signal SDL2, supplied from the drive signal generation circuit 1 to the first low side transistor ML1 and the second low side transistor ML2. The second combining circuit 6 logically combines the low side drive signals SDL1 and SDL2 with the second timing signal ST2, and forcibly turns the low side transistors ML1 and ML2 OFF, in a time period in which the second timing signal ST2 has a high level. The second combining circuit 6 fixes signal level of the low side drive signals SDL1 and SDL2 to a logical value at which the low side transistors ML1 and ML2 are OFF, in a time period in which the second timing signal ST2 has a high level.

Furthermore, in the present embodiment, the second combining circuit 6 sets ON and OFF states of the low side transistors ML1 and ML2 based on the low side drive signals SDL1 and SDL2, during a delay time τd.

High side drive signals SDH1' and SDH2', and low side drive signals SDL1' and SDL2', outputted from the first combining circuit 5 and the second combining circuit 6, are inputted to the pre-driver 7. The pre-driver 7 has adequate drive capability for driving the transistors that form the H-bridge circuit 110. The pre-driver 7 switches the transistors MH1, MH2, ML1, and ML2 ON and OFF based on the drive signals SDH1', SDH2', SDL1', and SDL2'.

The stop signal generation circuit 8 monitors states of the fan motor 120, and generates a stop signal Sstop which, when a predetermined condition is fulfilled, has a high level, and instructs the fan motor 120 to stop. In the present embodiment, the detection voltage Vdet corresponding to a current flowing in the coil of the fan motor 120 is inputted to the stop signal generation circuit 8. When the detection voltage Vdet exceeds a predetermined threshold voltage, that is, when the coil current exceeds a predetermined value, the stop signal generation circuit 8 puts the stop signal Sstop to a high level, and instructs the fan motor 120 to stop.

Besides the coil current of the fan motor 120, the stop signal generation circuit 8 monitors temperature of the fan motor 120, and when the temperature deviates from a predetermined temperature range, may put the stop signal Sstop to a high level. Furthermore, the stop signal generation circuit 8 monitors a rotation state of the fan motor 120, and when rotation is not possible due to a foreign object, or the like, may put the stop signal Sstop to a high level. The stop signal generation circuit 8 may monitor a plurality of information, perform composite analysis, and generate the stop signal Sstop. The stop signal generation circuit 8 may be understood to be a circuit which detects a circuit irregularity. Furthermore, the stop signal Sstop inputted to the timing signal generation circuit 4 may be given from outside the motor drive circuit 100.

An explanation will be given concerning operation of the motor drive circuit 100 configured as above. FIGS. 2A to 2E are time charts showing operation states for the motor drive circuit 100 according to the present embodiment when the motor is stopped. FIG. 2A shows the stop signal Sstop, FIG. 2B shows the first timing signal ST1, FIG. 2C shows the second timing signal ST2, FIG. 2D shows a high side drive signal SDH' outputted from the first combining circuit 5, and FIG. 2E shows a low side drive signal SDL' outputted from the second combining circuit 6.

In a time period from time t0 to t1, the motor drive circuit 100 rotates the fan motor 120 at a predetermined number of rotations. At time t1, when an irregularity in the circuit is detected by the stop signal generation circuit 8, the stop signal Sstop goes to a high level. When the stop signal Sstop goes to a high level, the timing signal generation circuit 4 immediately puts the first timing signal ST1 to a high level.

At time t1, when the first timing signal ST1 goes to a high level, the first combining circuit 5 fixes a logical value of a high side drive signal SDH, and turns the first high side transistor MH1 and the second high side transistor MH2 OFF.

At time t2 after the delay time τd has elapsed from time t1, the timing signal generation circuit 4 puts the second timing signal ST2 to a high level. When the second timing signal ST2 goes to a high level, the second combining circuit 6 fixes a logical value of the low side drive signal SDL, and turns the first low side transistor ML1 and the second low side transistor ML2 OFF.

In the time period of the delay time τd from time t1 to t2, ON and OFF states of the first low side transistor ML1 and the second low side transistor ML2 are controlled by the drive signals SDL1 and SDL2 generated by the drive signal generation circuit 1. As described above, since ON and OFF states of the first low side drive signal SDL1 and the second low side drive signal SDL2 are exclusively controlled, in the time t1 to t2 also, one of them is in an ON state and the other is in an OFF state, in accordance with a position of the rotor of the fan motor 120.

Figure 3C:
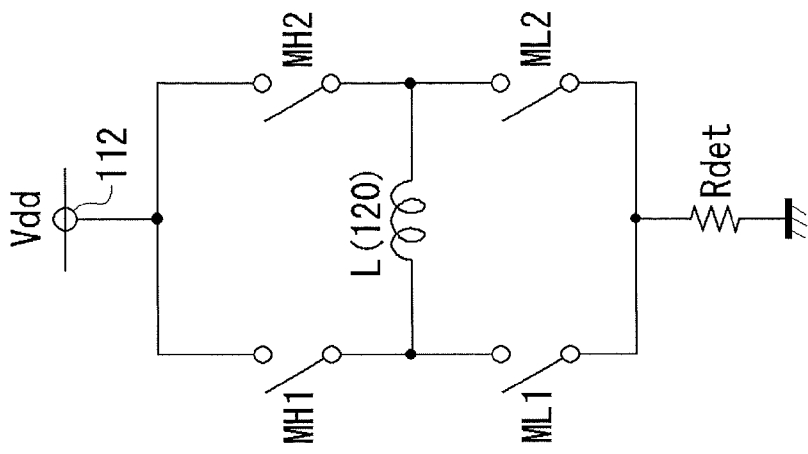
FIGS. 3A to 3C are diagrams showing states of a H-bridge circuit according to the first embodiment, when the motor is stopped.
Figure 3B:
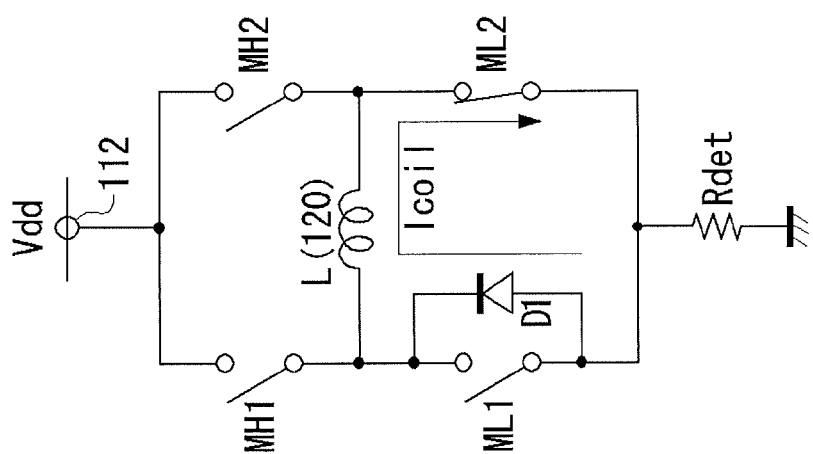
Figure 3A:
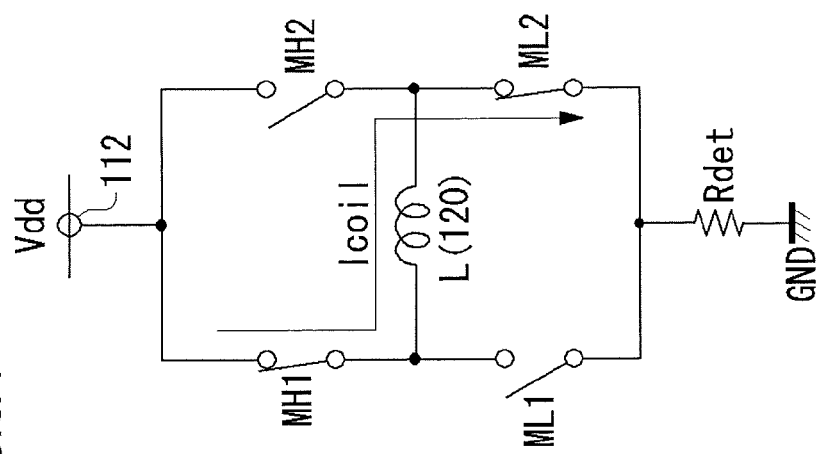

FIGS. 3A to 3C are diagrams showing states of the H-bridge circuit 110 when the motor is stopped. FIG. 3A shows a state immediately before time t1 at which the stop signal Sstop transitions to a high level, FIG. 3B shows a state in the time period of the delay time τd from time t1 to t2, and FIG. 3C shows a state after time t2. In FIGS. 3A to 3C, transistors forming the H-bridge circuit 110 are shown as switches.

As shown in FIG. 3A, immediately before time t1, at which the stop signal Sstop goes to a high level, the first high side transistor MH1 and the second low side transistor ML2 are taken as being in an ON state. At this time, the coil current Icoil flows in the coil L of the fan motor 120, from the power supply voltage terminal 112 by a path of the first high side transistor MH1, the coil L, and the second low side transistor ML2.

At time t1, when the first high side transistor MH1 and the second high side transistor MH2 are forcibly turned OFF, a back electromotive force is generated by energy stored in the coil L, and the coil current Icoil that was flowing in FIG. 3A continues to flow. As a result, the coil current Icoil is supplied via a body diode D1 that exists between a drain and a back gate of the first low side transistor ML1.

When the state shown in FIG. 3B is held for the delay time τd, energy stored in the coil L is dissipated, and the coil current Icoil becomes 0. Expressing this in an opposite way, it is desirable to set the delay time τd longer than time required for the energy to dissipate by regeneration. This time should be decided by coil inductance or the like, and for the motor used in the fan motor or the like, it is desirable to set this, for example, within a range of from sub-ms to tens of ms.

At time t2, when the second timing signal ST2 goes to a high level, as shown in FIG. 3C, all the transistors (switches) are OFF.

In this way, according to the motor drive circuit 100 according to the present embodiment, by providing a delay from when an instruction is given to stop the motor to when the low side transistors are turned OFF, it is possible to form a regenerative path by a loop including the two low side transistors, and it is possible to dissipate the regenerative current. As a result, since the regenerative current flowing in the coil L does not flow to the power supply externally connected, via the power supply voltage terminal 112, it is possible to prevent electrical potential of the power supply voltage terminal 112 from momentarily jumping up, due to a back electromotive voltage.

Furthermore, according to this embodiment, since the current does not flow to the power supply, a zener diode need not be arranged between the power supply voltage terminal 112 and the ground terminal, or a capacitor need not be provided, so that it is possible to simplify the circuit and to realize reduced costs.

Next, an explanation is given concerning a modified example of the first embodiment. In the above-mentioned embodiment, after the stop signal Sstop goes to a high level, the high side transistors are OFF, and after that, in a time period until the delay time τd elapses, the low side transistors are OFF. In the modified example, transition of the stop signal Sstop is received, the low side transistors are immediately turned OFF, and after that, after the delay time has elapsed, the high side transistors may be turned off.

This modified example can be easily realized, for example, in the timing signal generation circuit 4, by switching timing of level transition of the first timing signal ST1 and the second timing signal ST2.

Figure 4A:
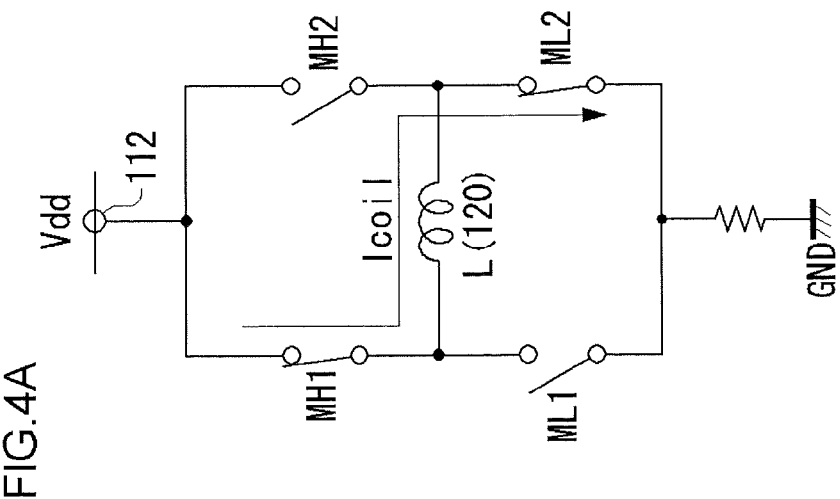
FIGS. 4A to 4C are diagrams showing states of the H-bridge circuit according to modified examples of the first embodiment, when the motor is stopped.
Figure 4B:
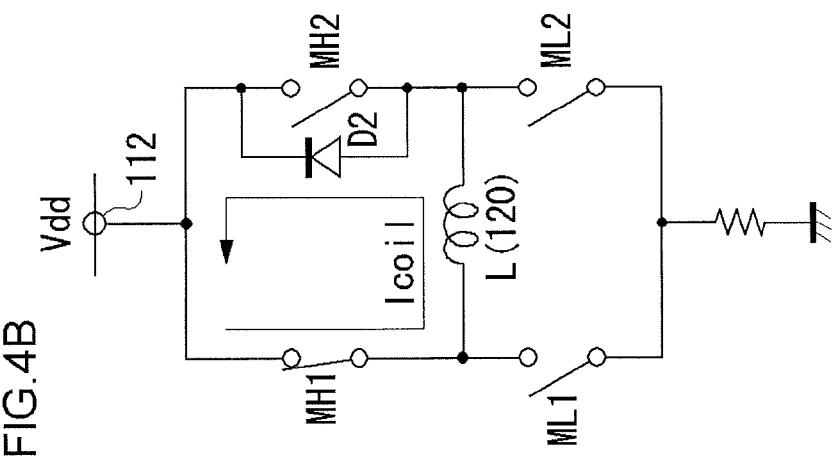
Figure 4C:
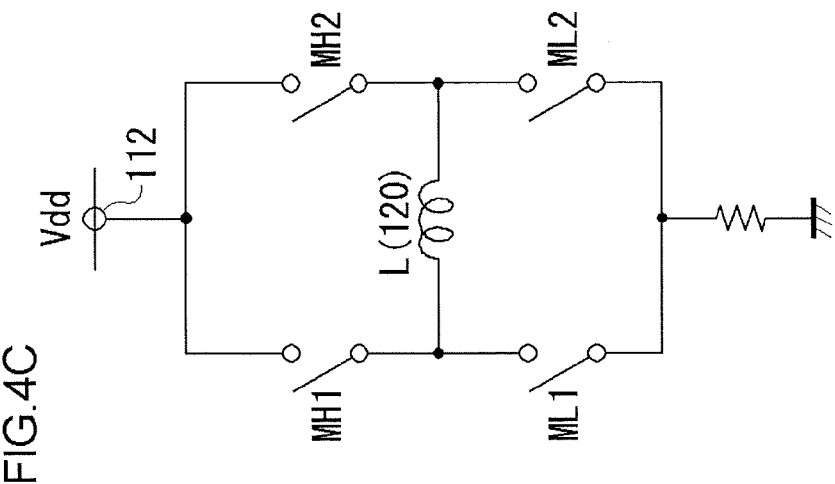

FIGS. 4A to 4C are diagrams showing states of the H-bridge circuit 110 when the motor is stopped in this modified example. FIGS. 4A and 4C are similar to FIGS. 3A and 3C. In the present modified example, during the delay time τd from time t1 to t2, the regenerative current flows in a loop formed of a body diode of the first high side transistor MH1 and the second high side transistor MH2. As a result, the regenerative current does not flow to the power supply (not shown in the figure) via the power supply voltage terminal 112, and it is possible to prevent electrical potential of the power supply voltage terminal 112 from momentarily jumping up.

Second Embodiment

In the first embodiment, in a time period from when the stop signal Sstop goes to a high level, to when the delay time τd elapses, ON and OFF states of the low side transistors (the high side transistors in the modified example) are set based on drive signals outputted from the drive signal generation circuit 1. Compared with this, in the second embodiment, in a time period from when a stop signal Sstop goes to a high level, to when a delay time τd elapses, the two low side transistors are forcibly turned ON and OFF.

A motor drive circuit 100 according to the second embodiment may be basically configured similarly to FIG. 1. For example, by inputting the first timing signal ST1, in addition to a second timing signal ST2, to a second combining circuit 6, and performing a logical operation on the two timing signals, a time period in which the first timing signal ST1 only has a high level is detected. In a time period in which the first timing signal ST1 only has a high level, in order that both the first low side transistor ML1 and the second low side transistor ML2 are both ON, the second combining circuit 6 controls a logical value of a first low side drive signal SDL1' and a second low side drive signal SDL2'.

FIGS. 5A to 5E are time charts showing operation states of the motor drive circuit 100 according to a second embodiment when a motor is stopped. Furthermore, FIGS. 6A to 6C are diagrams showing states of a H-bridge circuit 110 according to the present embodiment, when the motor is stopped.

The motor drive circuit 100 according to the second embodiment and the motor drive circuit 100 according to the first embodiment differ in their behavior only in the time period of the delay time τd from time t1 to t2. As shown in FIG. 5E, in the time period from time t1 to t2, a drive signal SDL' outputted from the second combining circuit 6 is set to a logical value at which both the first low side transistor ML1 and the second low side transistor ML2 are ON.

Figure 6A:
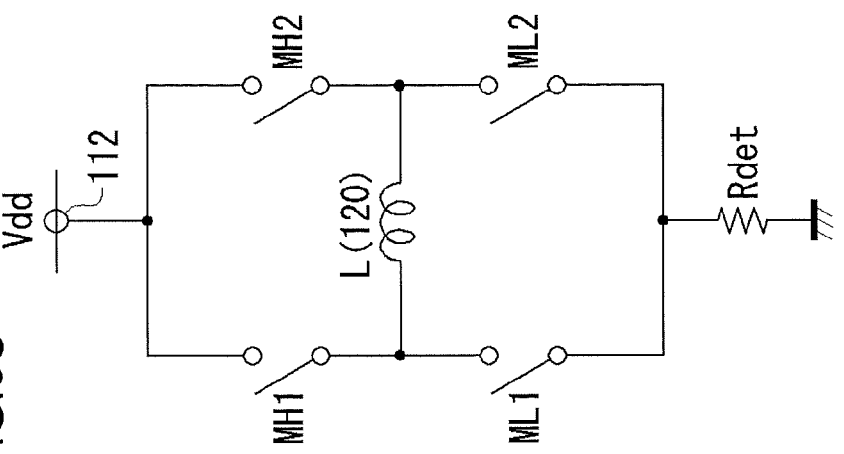
FIGS. 6A to 6C are diagrams showing states of a H-bridge circuit according to the second embodiment, when the motor is stopped.
Figure 6B:
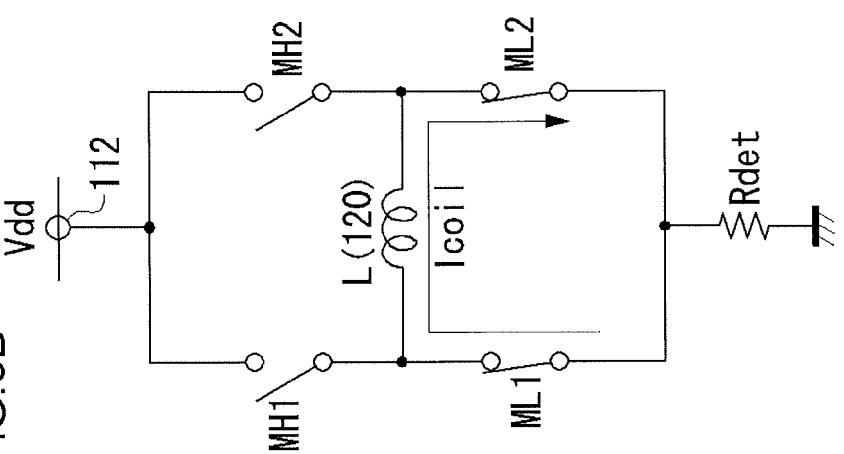
Figure 6C:
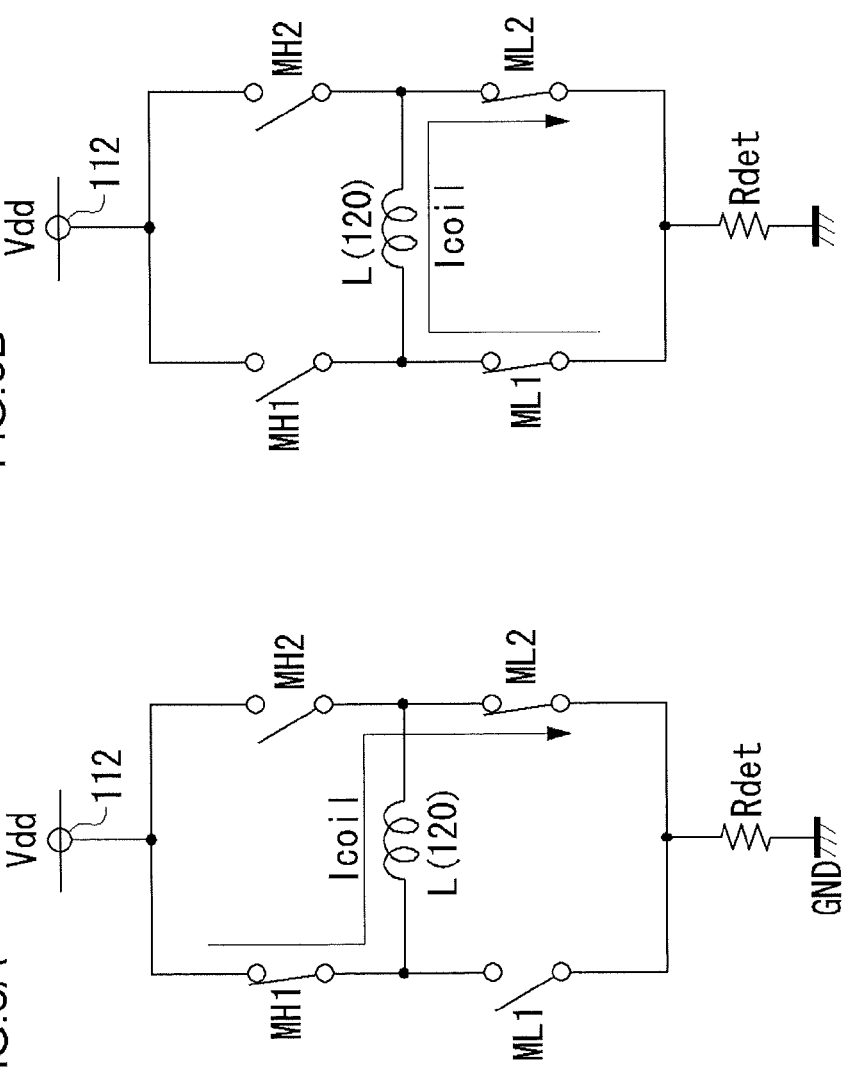

FIG. 6A shows a state immediately before time t1 at which the stop signal Sstop transitions to a high level, FIG. 6B shows a state in the time period of the delay time τd from time t1 to t2, and FIG. 6C shows a state after time t2.

As shown in FIG. 6B, in the present embodiment, during the delay time τd, the first low side transistor ML1 and the second low side transistor ML2 are in an ON state. As a result, in the first embodiment, the regenerative current flowing via the body diode of the first low side transistor ML1 flows in a channel of the first low side transistor ML1, a loop is formed by channels of the first low side transistor ML1 and the second low side transistor ML2, and energy stored in a coil is dissipated.

As in the first embodiment, when a current flows in a body diode of a transistor, a voltage drop of a forward direction voltage Vf amount is generated. On the other hand, in the present embodiment, since the regenerative current flows in the channel of the first low side transistor ML1, the voltage drop is a voltage Vds across a drain-source. Since the drain-source voltage Vds is small compared to the forward direction voltage Vf, it is possible to curtail power consumption.

Also in the present embodiment, a modified example similar to the first embodiment can be considered. That is, in the modified example, transition of a stop signal Sstop is received, low side transistors are immediately turned OFF, after that, during the delay time, the two high side transistors may be turned ON, and after that, the high side transistors may be turned OFF.

The abovementioned embodiment is an example, and a person skilled in the art will understand that various modified examples in combinations of various component elements and various processes thereof are possible, and that such modified examples are within the scope of the present invention.

In the embodiment, an explanation has been given of cases in which the motor drive circuit 100 is integrated as a unit on one LSI, but there is no limitation thereto, and part of the component elements may be arranged outside the LSI as discrete elements or as chip parts, or a configuration may be made of a plurality of LSIs. For example, the H-bridge circuit 110 may be configured using a discrete power transistor, or it may be embedded in the motor drive circuit 100.

Furthermore, regarding the transistors used in the embodiment, a bipolar transistor and an FET may be mutually substituted, and a configuration may be such that the P-channel and the N-channel transistors are substituted.

In the embodiment, an explanation has been given concerning cases in which a single-phase motor is driven, but the present invention is not limited thereto. That is, in a motor drive circuit which drives a three-phase motor or the like, when the motor is stopped, by shifting, by the delay time, timing at which the high side is OFF, and timing at which the transistors on the low side are turned OFF, it is possible to prevent the regenerative current from flowing towards the power supply.

In the present embodiment, an explanation has been given concerning cases in which the motor drive circuit 100 drives a fan motor, but a motor that is to be driven by the motor drive circuit according to the present invention is not limited to the fan motor, and the invention may be widely applied to other single-phase and polyphase motors.

In the circuits explained in the embodiment, setting of a logical value for a high level and a low level of a signal are one example, and it is possible to freely make changes by inversion as appropriate, by an inverter or the like.

Third Embodiment

An embodiment of the present invention relates to a motor drive circuit used in a cooling device for cooling electronic computers such as desktop or laptop personal computers, workstations, or the like, or electronic devices such as refrigerators or the like.

Figure 7:
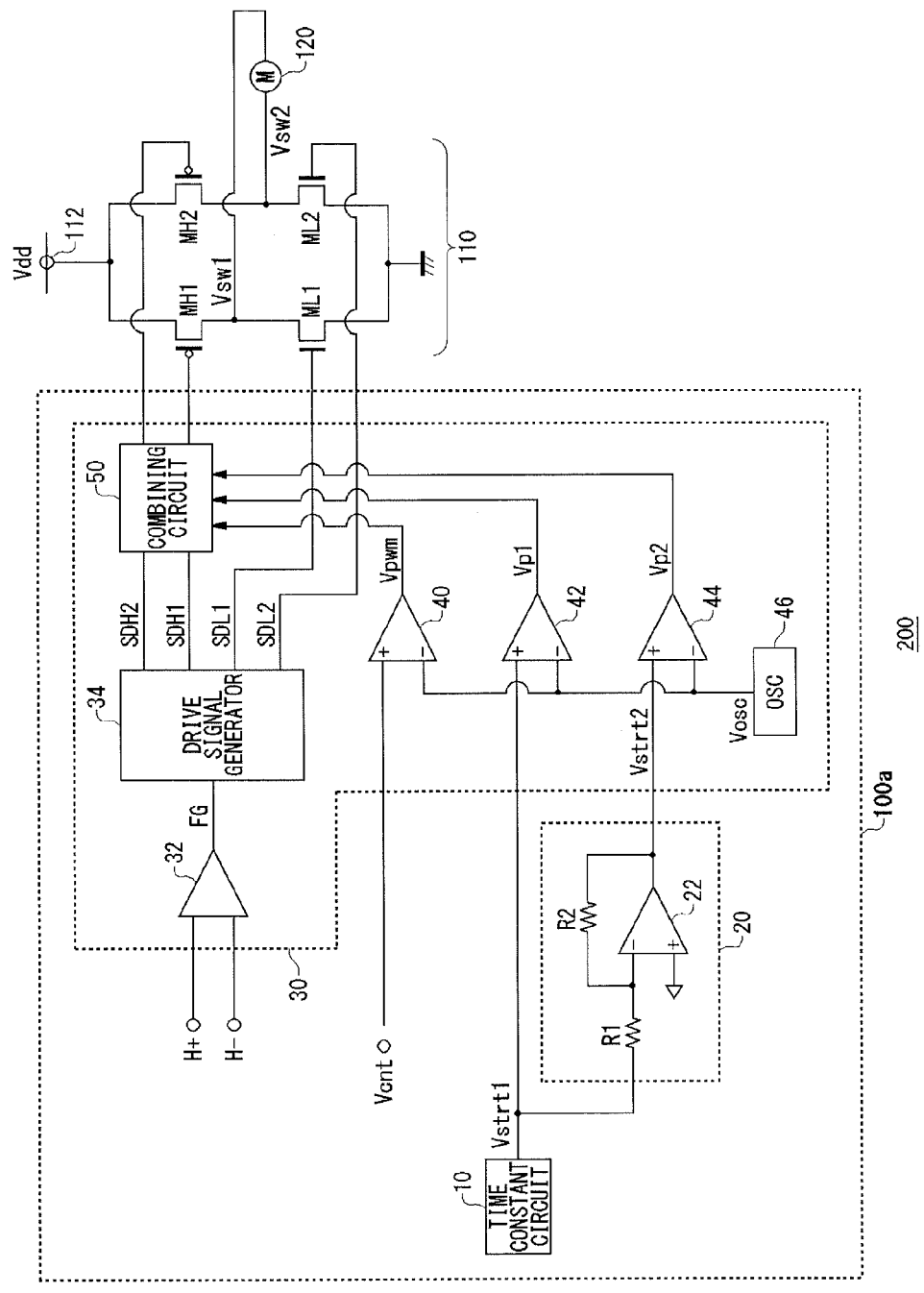
FIG. 7 is a circuit diagram showing a configuration of a cooling device according to a third embodiment.

FIG. 7 is a circuit diagram showing a configuration of a cooling device 200 according to a third embodiment of the present invention. The cooling device 200 includes a motor drive circuit 100a, a H-bridge circuit 110, and a fan motor 120.

The fan motor 120 is a single-phase full-wave motor in the present embodiment, and is arranged facing an object to be cooled, which is not shown in the figure. In the fan motor 120, a coil current, that is, a conduction state, is controlled, to control rotation by switching signals Vsw1 and Vsw2 generated by the motor drive circuit 100a and the H-bridge circuit 110.

The H-bridge circuit 110 includes a first high side transistor MH1, a second high side transistor MH2, a first low side transistor ML1, and a second low side transistor ML2. The H-bridge circuit 110 is equivalent to an output stage for driving the fan motor 120. The first high side transistor MH1 and the first low side transistor ML1 are connected in series between a power supply voltage terminal 112 and a ground terminal GND, and form a transistor pair (referred to below as a first transistor pair). In the same way, the second high side transistor MH2 and the second low side transistor ML2 form a transistor pair (referred to below as a second transistor pair). In the present embodiment, the first high side transistor MH1 and the second high side transistor MH2 are P-channel MOSFETs. Furthermore, the first low side transistor ML1 and the second low side transistor ML2 are N-channel MOSFETs.

The first high side transistor MH1 and the first low side transistor ML1 that form the first transistor pair are alternately and complementarily ON and OFF. ON and OFF states of the first high side transistor MH1 and the first low side transistor ML1 are controlled by a first high side drive signal SDH1 and a first low side drive signal SDL1, applied to each transistor gate.

Voltage of a connection point of the first high side transistor MH1 and the first low side transistor ML1 is applied to one end of a coil of the fan motor 120, as the first switching signal Vsw1. When the first high side transistor MH1 is ON, the first switching signal Vsw1 is a power supply voltage Vdd, and when the first low side transistor ML1 is ON, the first switching signal Vsw1 is a ground potential (0 V).

The ON and OFF states of the second high side transistor MH2 and the second low side transistor ML2, that form the second transistor pair, are controlled by a second high side drive signal SDH2 and a second low side drive signal SDL2, applied to each transistor gate. Voltage of a connection point of the two transistors is applied to the other end of the coil of the fan motor 120, as the second switching signal Vsw2. The second switching signal Vsw2 is controlled so as to have a reverse phase to the first switching signal Vsw1.

Furthermore, the four transistors that form the H-bridge circuit 110 may be integrated as a unit and embedded in the motor drive circuit 100a. Moreover, a diode to prevent reverse connection may be arranged at a source of the first high side transistor MH1 and the second high side transistor MH2, and a power supply (not shown in the figure) that outputs the power supply voltage Vdd.

A rotation control voltage Vcnt that is set corresponding to a target value of torque of the fan motor 120 is inputted from outside to the motor drive circuit 100a. This rotation control voltage Vcnt may be generated inside the motor drive circuit 100a. The motor drive circuit 100a generates pulse-modulated drive signals SDH1, SDL1, SDH2, SDL2 that define conduction time of the coil of the fan motor that is to be driven, based on the rotation control voltage Vcnt, and outputs the signals to the H-bridge circuit 110 that is an output stage. The motor drive circuit 100a is provided with a time constant circuit 10, an amplifier 20, and a drive signal generation circuit 30, and is a function IC integrated as a unit on one semiconductor substrate.

At startup time of the fan motor 120, the time constant circuit 10 generates a first startup control voltage Vstrt1 whose voltage value changes with time. The time constant circuit 10 can use various types of configurations such as a type in which a capacitor is charged by a constant current, a type in which a ramp waveform digital signal is converted into an analog signal, or the like, and circuit configuration thereof is not particularly limited.

The amplifier 20 amplifies the first startup control voltage Vstrt1 generated by the time constant circuit 10, and outputs the amplified voltage as a second startup control voltage Vstrt2. In the present embodiment, the amplifier 20 is a inverting amplifier, and includes an operational amplifier 22, a first resistor R1, and a second resistor R2. One end of the first resistor R1 is connected to a inverting input terminal of the operational amplifier 22, and the first startup control voltage Vstrt1 is applied to the other end thereof. For the second resistor R2, one end is connected to an output terminal of the operational amplifier 22, and the other end is connected to the inverting input terminal of the operational amplifier 22. A fixed voltage is applied to a noninverting input terminal of the operational amplifier 22.

In the present embodiment, the first startup control voltage Vstrt1 is a voltage that gradually increases with time, when driving of the motor is started. Therefore, the second startup control voltage Vstrt2 drops gradually with time.

In the amplifier 20, at least one of the first resistor R1 and the second resistor R2 is a variable resistor, and it is desirable that the amplifier 20 be a variable gain amplifier. In such cases, it is desirable that gain of the amplifier 20 be controllable by a control circuit, not shown in the figure.

The drive signal generation circuit 30 combines the rotation control voltage Vcnt with the first startup control voltage Vstrt1 and the second startup control voltage Vstrt2, and generates a pulse-modulated signal having a duty ratio corresponding to any of the three voltages. Below, an explanation is given concerning a specific configuration example of the drive signal generation circuit 30.

The drive signal generation circuit 30 includes a comparator 32, a drive signal generator 34, a combining circuit 50, a pulse-width modulation comparator (referred to below as PWM comparator) 40, a first comparator 42, a second comparator 44, and an oscillator 46.

The comparator 32 compares Hall signals H+ and H− outputted from a Hall element, not shown in the figure, and generates a frequency generation signal (referred to below as FG), in which a high level and a low level change in accordance with phase of rotor of the fan motor 120.

The drive signal generator 34 generates drive signals SDH1, SDH2, SDL1, and SDL2, based on the FG signal. In the present embodiment, the motor drive circuit 100a controls conduction time period of the fan motor 120 by pulse-width modulation. When performing the motor drive control by the pulse-width modulation, in the present embodiment, the low side transistors ML1 and ML2 are alternately turned ON and OFF corresponding to phase switching of the fan motor 120, and switching control of the high side transistors MH1 and MH2 is performed based on a pulse-width modulated signal. The present invention is not limited thereto; the low side transistors may be driven by a pulse-width modulated signal, and transistors on both the high side and the low side may be driven by the pulse-width modulated signal.

For example, when the FG signal is at a high level, the drive signal generator 34 generates a drive signal SD so that the first high side transistor MH1 and the second low side transistor ML2 are ON, and the second high side transistor MH2 and the first low side transistor ML1 are OFF. Here, it is desirable to give a delay to transition of signal levels and set a deadtime, so that the first high side transistor MH1 and the first low side transistor ML1 are not ON at the same time, and that the second high side transistor MH2 and the second low side transistor ML2 are not ON at the same time.

The drive signals SDL1 and SDL2 outputted from the drive signal generator 34 are outputted respectively to the first low side transistor ML1 and the second low side transistor ML2 of the low side. As a result, the first low side transistor ML1 and the second low side transistor ML2 alternately repeat ON and OFF states corresponding to high level and low level of the FG signal.

On the other hand, the drive signals SDH1 and SDH2 outputted from the drive signal generator 34 are outputted to the combining circuit 50. The combining circuit 50 performs pulse-width modulation on the drive signals SDH1 and SDH2 outputted from the drive signal generator 34, and outputs the signals to the first high side transistor MH1 and the second high side transistor MH2. The combining circuit 50 will be described later; an explanation concerning the pulse-width modulation will be given next.

The oscillator 46 generates a cyclic voltage Vsaw of a triangular waveform or a sawtooth waveform having a predetermined frequency. The PWM comparator 40 generates a pulse-width modulation signal (referred to below as a PWM signal Vpwm) by comparing the rotation control voltage Vcnt to a cyclic voltage Vosc. In the present embodiment, the rotation control voltage Vcnt is inputted to a noninverting input terminal of the PWM comparator 40, and the cyclic voltage Vosc is inputted to the inverting input terminal. As a result, the PWM signal Vpwm has a high level when Vcnt>Vosc, and a low level when Vcnt<Vosc. The higher the control voltage Vcnt, the longer the time for which the PWM signal Vpwm has a high level.

The first comparator 42 generates the first control pulse signal Vp1 by comparing the first startup control voltage Vstrt1 and the cyclic voltage Vosc. In the present embodiment, the first startup control voltage Vstrt1 is inputted to the noninverting input terminal of the first comparator 42, and the cyclic voltage Vosc is inputted to the inverting input terminal. As a result, the first control pulse signal Vp1 has a high level when Vstrt1>Vosc, and has a low level when Vstrt1<Vosc. The higher the first startup control voltage Vstrt1 is, the longer the time for which the first control pulse signal Vp1 has a high level.

On the other hand, the second comparator 44 generates the second control pulse signal Vp2 by comparing the second startup control voltage Vstrt2 with the cyclic voltage Vosc. In the present embodiment, the second startup control voltage Vstrt2 is inputted to the noninverting input terminal of the second comparator 44, and the cyclic voltage Vosc is inputted to the inverting input terminal. As a result, the second control pulse signal Vp2 has a high level when Vstrt2>Vosc, and has a low level when Vstrt2<Vosc. The higher the second startup control voltage Vstrt2 is, the longer the time for which the second control pulse signal Vp2 has a high level.

In the present embodiment, since the first startup control voltage Vstrt1 gradually increases with time, when driving of the motor is started and the second startup control voltage Vstrt2 gradually decreases with time, a duty ratio of the first control pulse signal Vp1 increases with time, and on the other hand, a duty ratio of the second pulse signal Vp2 decreases with time.

In the present embodiment, for the PWM signal Vpwm, the first comparator 42, and the second comparator 44, a high level corresponds to an ON state of the low side transistors that form the H-bridge circuit 110, and a low level corresponds to an OFF state of the low side transistors.

Furthermore, for the PWM comparator 40, the first comparator 42, and the second comparator 44, the issue as to which signal is inputted to the inverting input terminal and the noninverting input terminal is a design matter, and is not something that is limited to this embodiment.

The PWM signal Vpwm, the first control pulse signal Vp1, and the second control pulse signal Vp2, outputted respectively from the PWM comparator 40, the first comparator 42, and the second comparator 44, are inputted to the combining circuit 50. Below, an explanation is given concerning a configuration and operation of the combining circuit 50.

Figure 8:
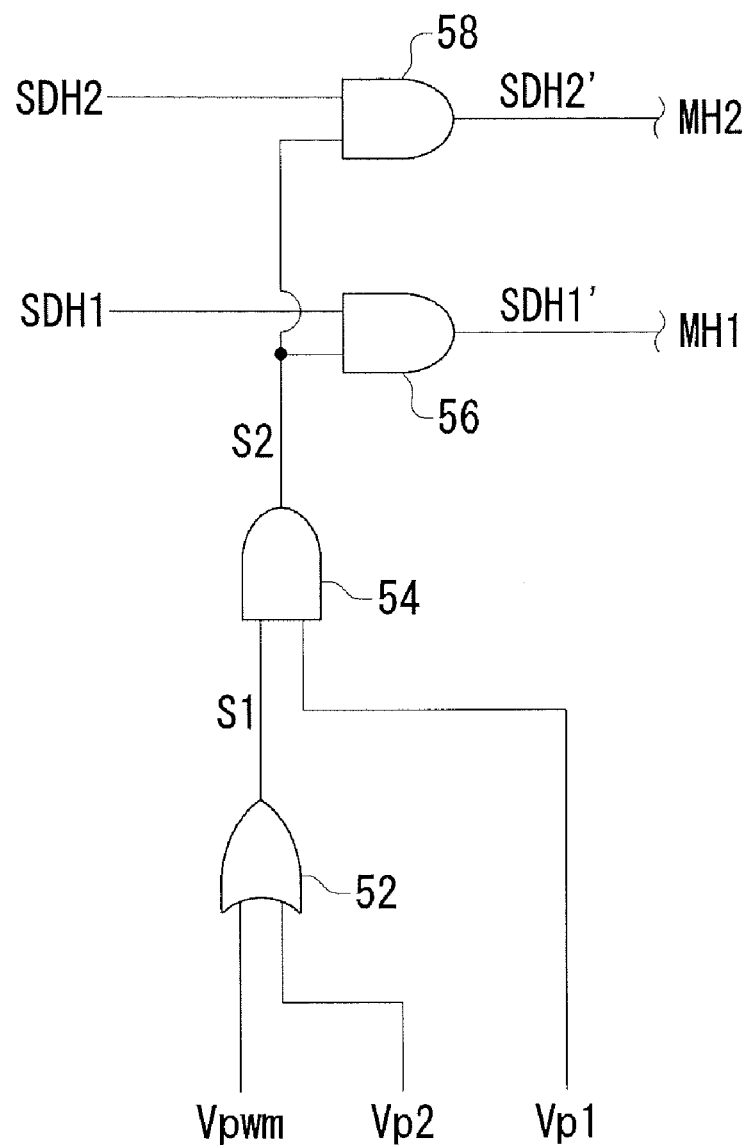
FIG. 8 is a circuit diagram showing a configuration example of a combining circuit.

FIG. 8 is a circuit diagram showing a configuration example of the combining circuit 50. In the present embodiment, the combining circuit 50 includes a first logic block 52, a second logic block 54, a third logic block 56, and a fourth logic block 58.

In the present embodiment, the first logic block 52 performs a logical operation on the PWM signal Vpwm generated by the PWM comparator 40, with the second control pulse signal Vp2 generated by the second comparator 44. The first logic block 52 is configured to include an OR gate, and outputs a logical sum of the PWM signal Vpwm and the second control pulse signal Vp2.

An output signal S1 of the first logic block 52 is, among the PWM signal Vpwm and the second control pulse signal Vp2, of priority a signal with a long high level time, that is, a signal for which the torque of the fan motor 120 is set high.

The second logic block 54 combines the first control pulse signal Vp1 generated by the first comparator 42, with the output signal S1 of the first logic block 52. In the present embodiment, the second logic block 54 is configured to include an AND gate, and outputs a logical product of the output signal S1 of the first logic block 52 and the first control pulse signal Vp1.

An output signal S2 of the second logic block 54 is, among the output signal S1 of the first logic block 52 and the second control pulse signal Vp2, of priority a signal with a shorter high level time period, that is, a signal for which the torque of the fan motor 120 is lower.

The output signal S2 of the second logic block 54 generated in this way is a pulse-width modulated signal having a duty ratio corresponding to any of the rotation control voltage Vcnt, the first startup control voltage Vstrt1, and the second startup control voltage Vstrt2.

The third logic block 56 combines the first high side drive signal SDH1 outputted from the drive signal generator 34, with the output signal S2 of the second logic block 54. The third logic block 56 includes an AND gate and outputs a logical product of the first high side drive signal SDH1 and the output signal S2 of the second logic block 54. The output signal of the third logic block 56 is outputted to a gate of the first high side transistor MH1, as a pulse-width modulated drive signal SDH1'.

The fourth logic block 58, similar to the third logic block 56, includes an AND gate, combines the second high side drive signal SDH2 outputted from the drive signal generator 34, and the output signal S2 of the second logic block 54, and outputs a logical product of the two signals. The output signal of the fourth logic block 58 is outputted to a gate of the second high side transistor MH2, as a pulse-width modulated drive signal SDH2'.

Furthermore, in cases in which the size of transistors forming the H-bridge circuit 110 is large and driving capability is required, a pre-driver circuit having adequate driving capability is necessary at a forward stage of the H-bridge circuit 110, but this is not shown in the figure.

Figure 9A:
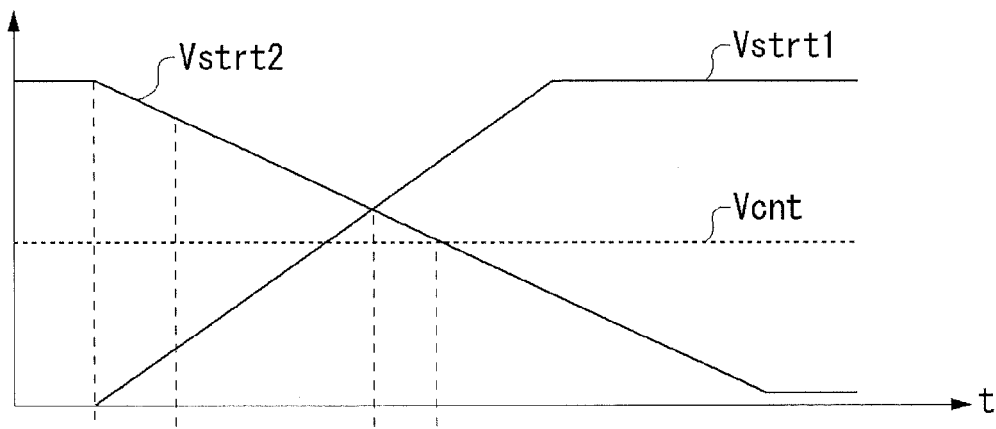
FIGS. 9A to 9D are time charts showing operation states of a motor drive circuit of FIG. 7, when a motor is started up.
Figure 9B:
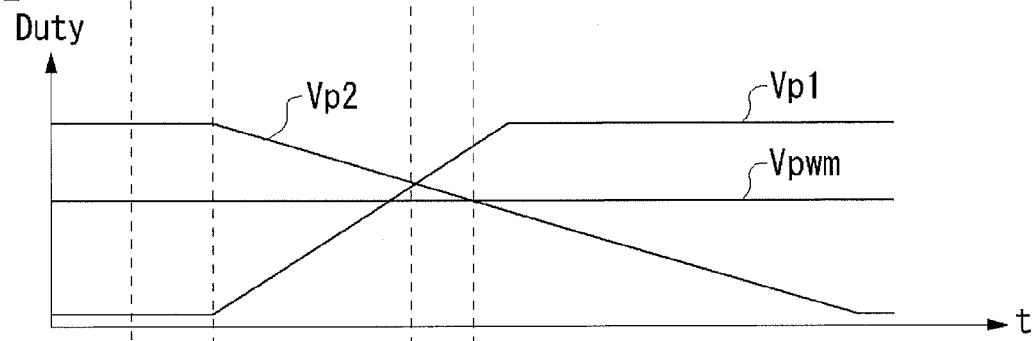
Figure 9C:
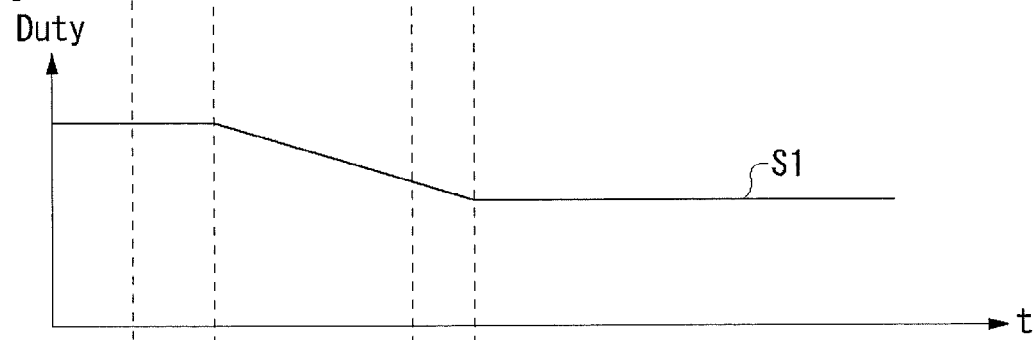
Figure 9D:
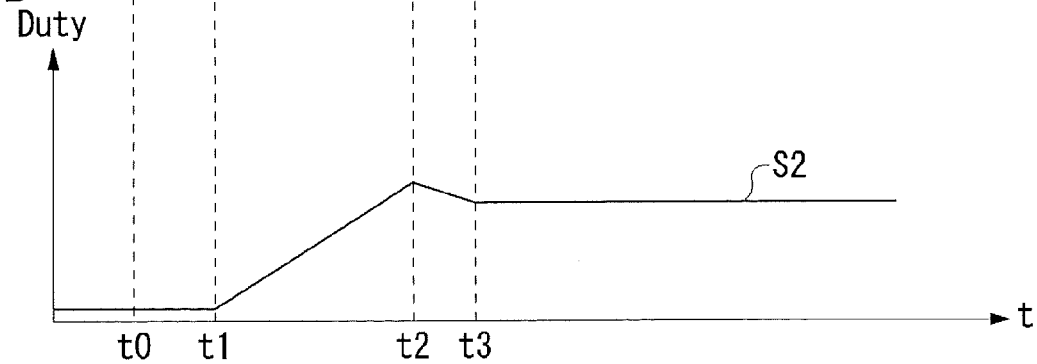

An explanation will be given concerning operation of the motor drive circuit 100a configured as above. FIGS. 9A to 9D are time charts showing operation states of a motor drive circuit 100a according to the present embodiment, when the motor is started up. FIG. 9A shows the rotation control voltage Vcnt, the first startup control voltage Vstrt1, and the second startup control voltage Vstrt2. Furthermore, FIG. 9B shows duty ratios of the PWM signal Vpwm, the first control pulse signal Vp1 and the second control pulse signal Vp2; FIG. 9C shows a duty ratio of the output signal S1 of the first logic block 52; and FIG. 9D shows a duty ratio of the output signal S2 of the second logic block 54.

At time t0, an instruction is given to start driving the fan motor 120, and the time constant circuit 10 makes the first startup control voltage Vstrt1 gradually increase. In contrast to the increase of the first startup control voltage Vstrt1, the second startup control voltage Vstrt2 outputted from the amplifier 20 decreases with time.

At time t1, when the first startup control voltage Vstrt1 becomes higher than a bottom level of the cyclic voltage Vosc outputted from the oscillator 46, the duty ratio of the first control pulse signal Vp1 begins to gradually increase. In the same way, when the second startup control voltage Vstrt2 becomes lower than a peak level of the cyclic voltage Vosc, the duty ratio of the second control pulse signal Vp2 begins to decrease. Since the rotation control voltage Vcnt is constant, the duty ratio of the PWM signal Vpwm is fixed.

As described above, since the output signal S1 of the first logic block 52 is a logical sum of the second control pulse signal Vp2 and the PWM signal Vpwm, the larger of the duty ratios among the two signals is reflected. As a result, as shown in FIG. 9C, the duty ratio of the output signal S1 of the first logic block 52 has a maximum value (for example, 100%), in a time period from time t0 to t1, and gradually decreases after time t1. After time t3 when the duty ratio of the second control pulse signal Vp2 goes below the duty ratio of the PWM signal Vpwm, the duty ratio of the output signal S1 becomes equal to the duty ratio of the PWM signal Vpwm.

Since the output signal S2 of the second logic block 54 is a logical product of the first control pulse signal Vp1 and the output signal S1 of the first logic block 52, the smaller of the duty ratios among the two signals is reflected. As a result, as shown in FIG. 9D, the duty ratio of the output signal S2 of the second logic block 54 has a minimum value (for example, 0%), in a time period from time t0 to t1, and gradually decreases after time t1. After time t2 when the duty ratio of the first control pulse signal Vp1 goes above the duty ratio of the PWM signal Vpwm, the duty ratio of the output signal S2 becomes equal to the duty ratio of the output signal S1 of the first logic block 52.

ON and OFF states of the low side transistors ML1 and ML2 of the H-bridge circuit 110 are PWM-controlled based on the duty ratio of the output signal S2 of the first logic block 52. As a result, according to the motor drive circuit 100a according to the present embodiment, in a time period from time t1 to t2, excitation time for a coil of the fan motor 120 is set to gradually become longer, by the PWM control. After once exceeding a target value torque, at time t2 the excitation time of the coil is set to gradually become shorter, and is set to a target value torque at time t3.

According to the motor drive circuit 100a according to the present embodiment, the pulse-width modulated first control pulse signal Vp1 and the second control pulse signal Vp2 are generated, based on the first startup control voltage Vstrt1 and the second startup control voltage Vstrt2, which is the first startup control voltage Vstrt1 amplified, and these pulse signals are combined with the PWM signal Vpwm, to control the torque of the motor. As a result, it is possible to perform various types of startup control according to the type of the fan motor 120.

For example, as shown in FIG. 9D, by once exceeding the target torque and driving the fan motor 120 with a large duty ratio, and after that, decreasing the duty ratio, it is possible to preferably drive the fan motor 120, which has a large friction when stopped.

Furthermore, in cases in which the amplifier 20 of the motor drive circuit 100a is a variable gain amplifier, it is possible to control gradient of the second startup control voltage Vstrt2, and thus it is possible to control speed at which the duty ratio of the first control pulse signal Vp1 increases.

Figure 10A:
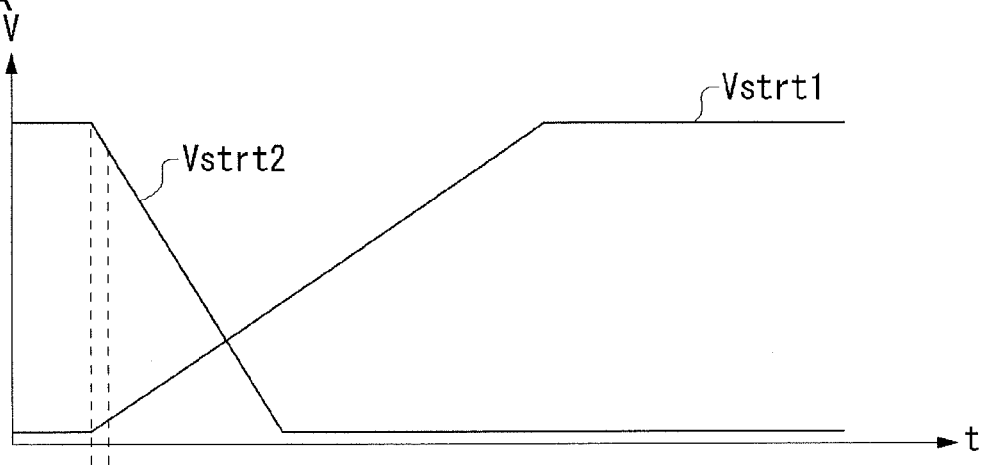
FIGS. 10A to 10D are time charts showing operation states in cases in which gain of an amplifier is set high.
Figure 10B:
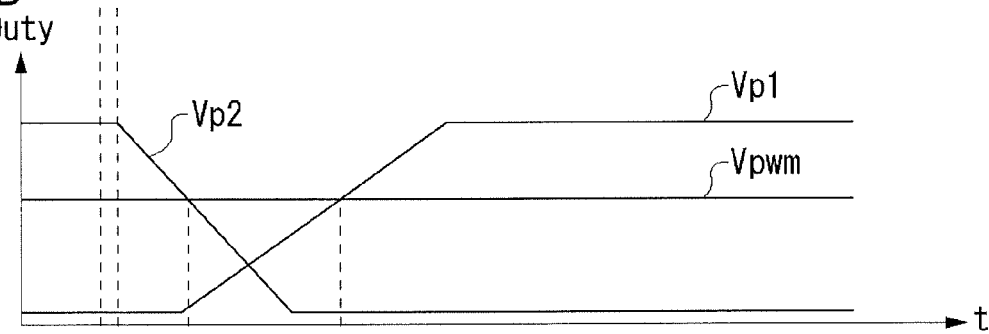
Figure 10C:
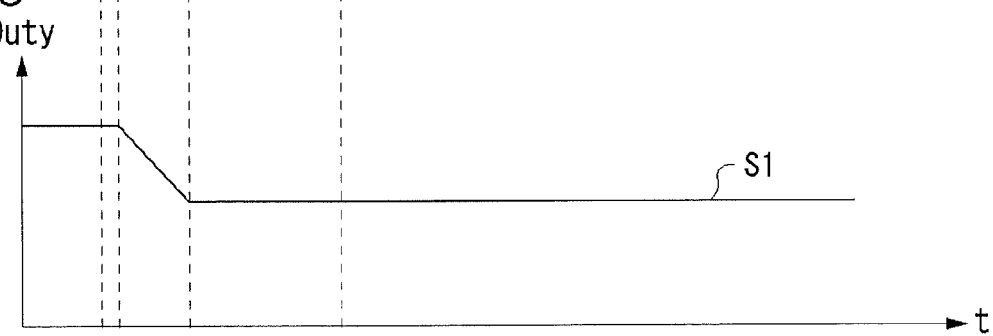
Figure 10D:
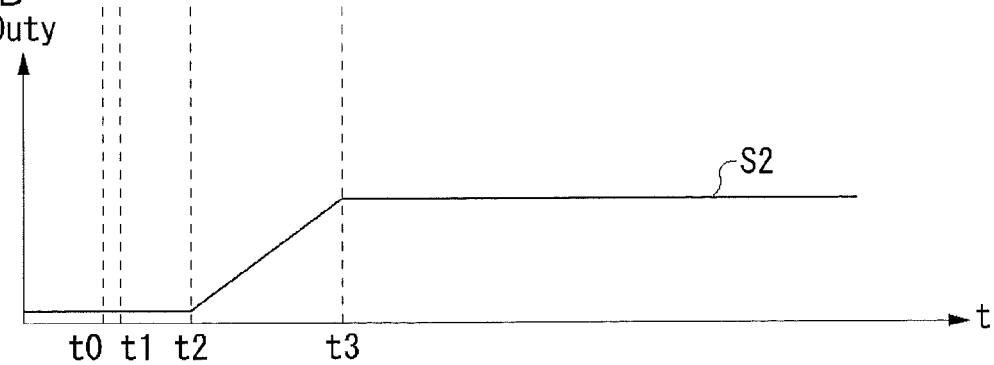

For example, in the present embodiment, operations in cases in which gain of the amplifier 20 is set to be high, are shown in FIGS. 10A to 10D. In cases in which the gain of the amplifier 20 is high, the second startup control voltage Vstrt2 rapidly decreases. As a result, the duty ratio of the second control pulse signal Vp2 also decreases rapidly in comparison to FIG. 9B. As a result, as shown in FIG. 10D, the duty ratio of the second control pulse signal Vp2 that is set based on the second startup control voltage Vstrt2, is not reflected in the output signal S2 of the second logic block 54. In these cases, it is possible to gradually increase the torque of the fan motor 120 to the target torque, and it is possible to execute an operation equivalent to a normal soft start.

Furthermore, according to the motor drive circuit 100a according to the present embodiment, it is possible to start rotation of the fan motor 120 at full torque. In these cases, for example, the first startup control voltage Vstrt1, which is an output of the time constant circuit 10, is increased at a very fast speed. As a result, since the duty ratio at startup time increases to close to 100%, rotation begins at full torque. After that, when the second startup control voltage Vstrt2 decreases, the duty ratio is set to gradually decrease towards the target value.

Moreover, according to the motor drive circuit 100a according to the present embodiment, it is possible to preferably perform control of the torque of the fan motor 120, and it is possible to reduce noise.

Fourth Embodiment

In the third embodiment, an explanation was given concerning cases in which the H-bridge circuit 110 is PWM-driven by logically combining three pulse-width modulation signals Vpwm1, Vp1, and Vp2. In contrast to that, in the fourth embodiment, pulse-width modulation is performed after combining three voltages Vcnt, a first startup control voltage Vstrt1, and a second startup control voltage Vstrt2.

Figure 11:
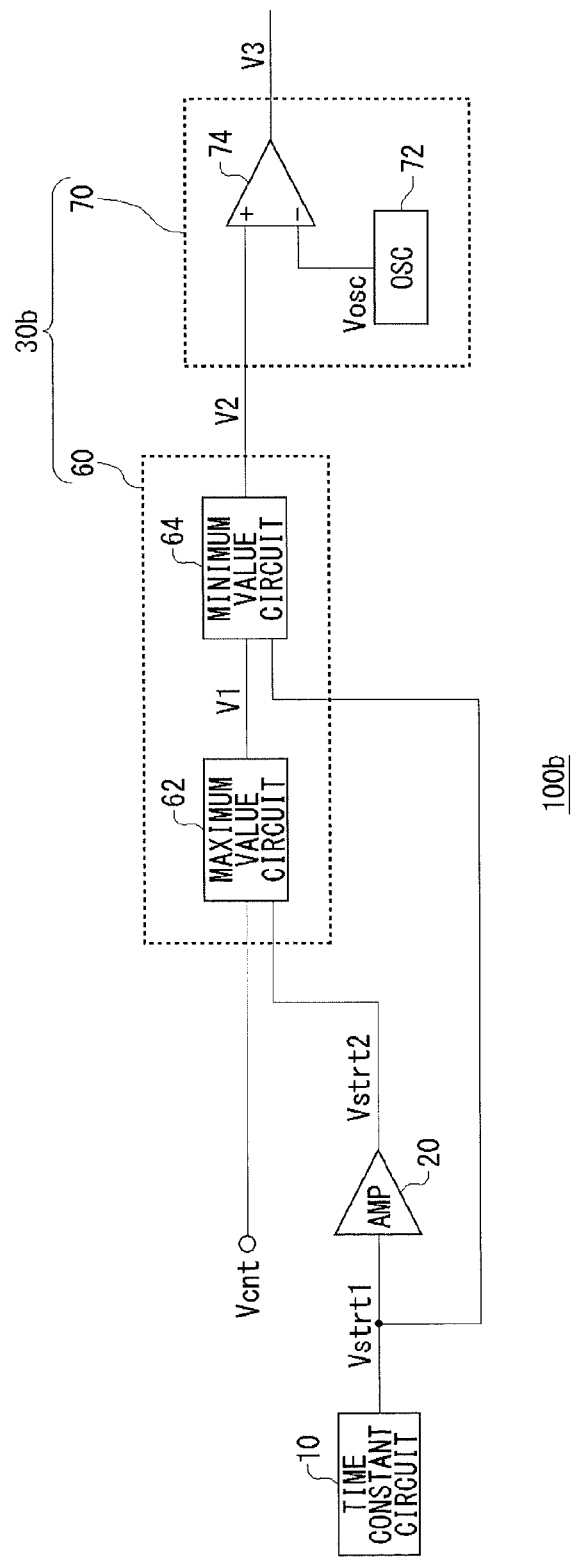
FIG. 11 is a circuit diagram showing part of a configuration of a motor drive circuit according to a fourth embodiment.

FIG. 11 is a circuit diagram showing part of a configuration of a motor drive circuit 100b according to the fourth embodiment of the present invention. Furthermore, members not shown in FIG. 11 can be configured in the same way as in FIG. 7.

In the present embodiment, a drive signal generation circuit 30b of the motor drive circuit 100b is configured to include a voltage selection circuit 60 and a pulse-width modulator 70. A rotation control voltage Vcnt, a first startup control voltage Vstrt1, and a second startup control voltage Vstrt2 are inputted to the voltage selection circuit 60. Based on size relationships of the rotation control voltage Vcnt, the first startup control voltage Vstrt1, and the second startup control voltage Vstrt2, the voltage selection circuit 60 selects a voltage from among the three voltages.

For example, the voltage selection circuit 60 includes a maximum value circuit 62 and a minimum value circuit 64. The maximum value circuit 62 outputs the larger voltage among the rotation control voltage Vcnt and the second startup control voltage Vstrt2. The minimum value circuit 64 outputs the lower voltage among the first startup control voltage Vstrt1 and an output voltage V1 of the maximum value circuit 62. An output voltage V2 of the minimum value circuit 64 outputs to a pulse-width modulator 70. The output voltage V2 of the voltage selection circuit 60 has a voltage value corresponding to whichever among the inputted three voltages Vcnt, Vstrt1, and Vstrt2 is selected based on the size relationships.

The pulse-width modulator 70 includes an oscillator 72 and a PWM comparator 74. The oscillator 72 generates a cyclic voltage Vosc. The PWM comparator 74 compares the cyclic voltage Vosc and the output voltage V2 of the voltage selection circuit 60, and outputs a signal at a high level, when V2>Vosc, and at a low level when V2<Vosc. An output voltage V3 of the pulse-width modulator 70 corresponds to a signal S2, in the combining circuit 50 shown in FIG. 8.

The output voltage V3 of the pulse-width modulator 70 is logically combined with the first high side drive signal SDH1 and the second high side drive signal SDH2 outputted from the drive signal generator 34, and is outputted to the first high side transistor MH1 and the second high side transistor MH2.

Figure 12A:
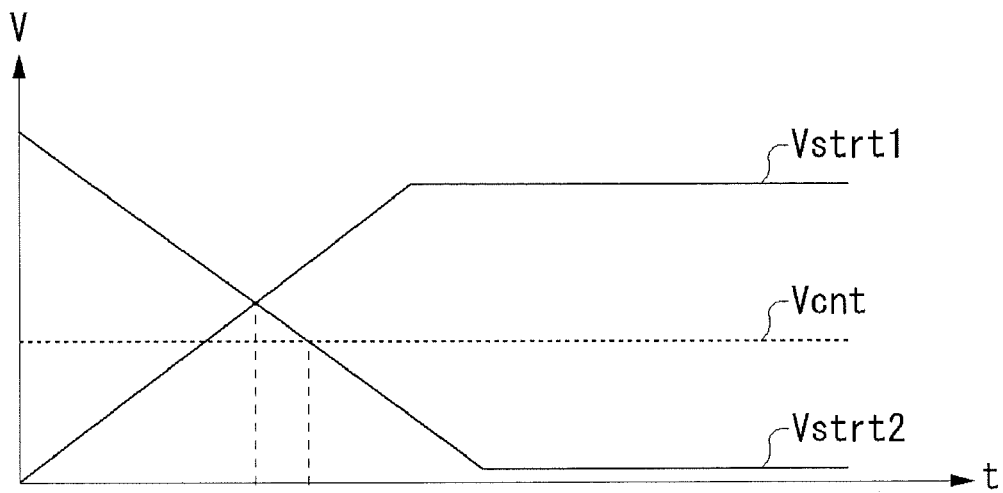
FIGS. 12A to 12C are time charts showing operation states of the motor drive circuit of FIG. 11, when a motor is started up.
Figure 12B:
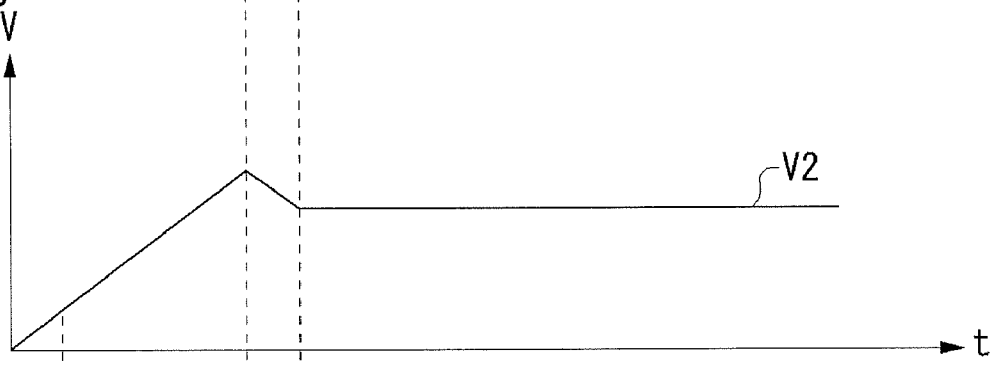
Figure 12C:
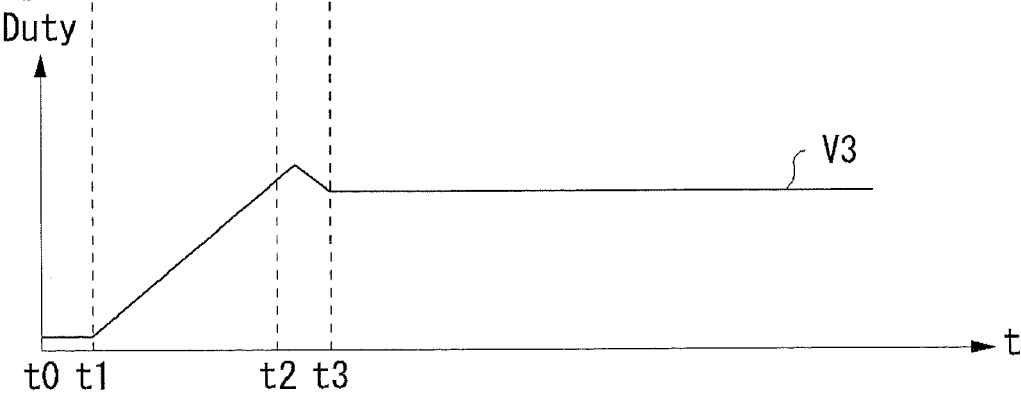

FIGS. 12A to 12C are time charts showing operation states of the motor drive circuit 100b of FIG. 11 according to the fourth embodiment, when the motor is started up.

As shown in FIG. 12B, in a time period from time t0 to t2, the output voltage V2 of the voltage selection circuit 60 has a voltage value the same as the first startup control voltage Vstrt1. After that, in a time period from time t2 to t3, the output voltage has a voltage value the same as the second startup control voltage Vstrt2, and after time t3, has a voltage value the same as the rotation control voltage Vcnt.

As shown in FIG. 12C, a duty ratio of the output voltage V3 of the pulse-width modulator 70 gradually increases after time t1 at which the voltage V2 exceeds a bottom level of the cyclic voltage Vosc. After that, after exceeding a duty ratio corresponding to a target torque, in a time period from time t2 to t3, the duty ratio decreases. After time t3, a setting is made to a duty ratio corresponding to the target torque.

According to the motor drive circuit 100b according to the fourth embodiment, similarly to the motor drive circuit 100a according to the third embodiment, it is possible to drive the fan motor 120 at various duty ratios, in accordance with a setting of a time constant of a time constant circuit 10.

Fifth Embodiment

Figure 13:
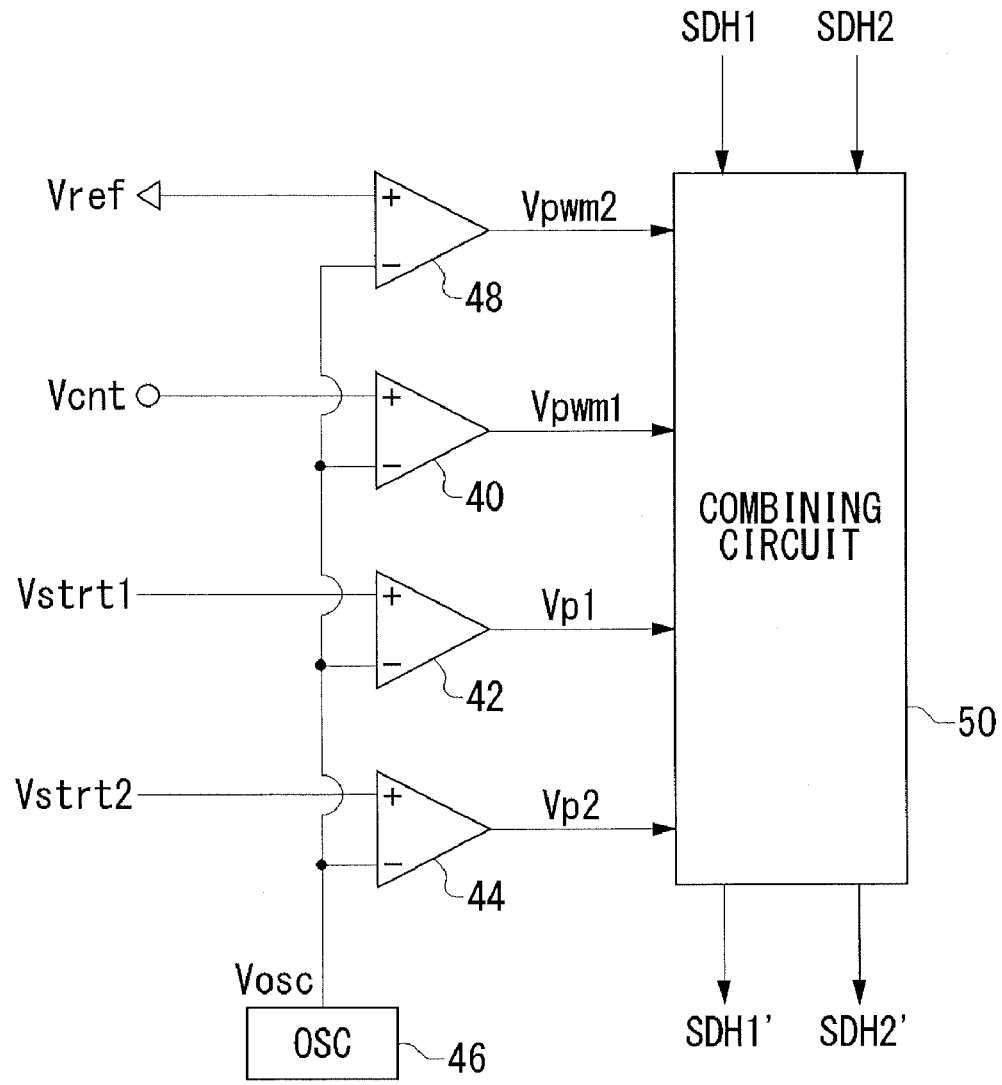
FIG. 13 is a circuit diagram showing part of a configuration of a motor drive circuit according to a fifth embodiment.

FIG. 13 is a circuit diagram showing part of a configuration of a motor drive circuit 100c according to a fifth embodiment. The motor drive circuit 100c according to the present embodiment, in addition to the motor drive circuit 100a of FIG. 7, is provided with a second PWM comparator 48 which compares the cyclic voltage Vosc with a predetermined reference voltage Vref. The reference voltage Vref may be inputted from outside the motor drive circuit 100c, or may be generated internally in the motor drive circuit 100c, but it is desirable that a voltage value thereof be controllable.

The second PWM comparator 48 compares the reference voltage Vref and the cyclic voltage Vosc, and outputs a second PWM signal Vpwm2 at a high level when Vref>Vosc, and at a low level when Vref<Vosc. A duty ratio of the second PWM signal Vpwm2 is set to correspond to the reference voltage Vref, and has a constant value. The second PWM signal Vpwm2 is outputted, together with the PWM signal Vpwm1, the first control pulse signal Vp1, and the second control pulse signal Vp2, to the combining circuit 50.

The combining circuit 50 combines the pulse modulation signal Vpwm1, the first control pulse signal Vp1, the second control pulse signal Vp2, and the second PWM signal Vpwm2, by a logical operation, and in addition, combines the drive signals SDH1 and SDH2 generated by the drive signal generator 34, to output drive signals SDH1' and SDH2'.

A configuration of the combining circuit 50 may be formed similarly to FIG. 8. That is, the combining circuit 50 of FIG. 8 is configured to include a first logic block 52 and a second logic block 54; however, by additionally providing a third logic block, and logically combining, in a certain order, four pulse signals Vpwm1, Vp1, Vp2, and Vpwm2, it is possible to generate a signal having a duty ratio of any of the four pulse signals.

Figure 14:
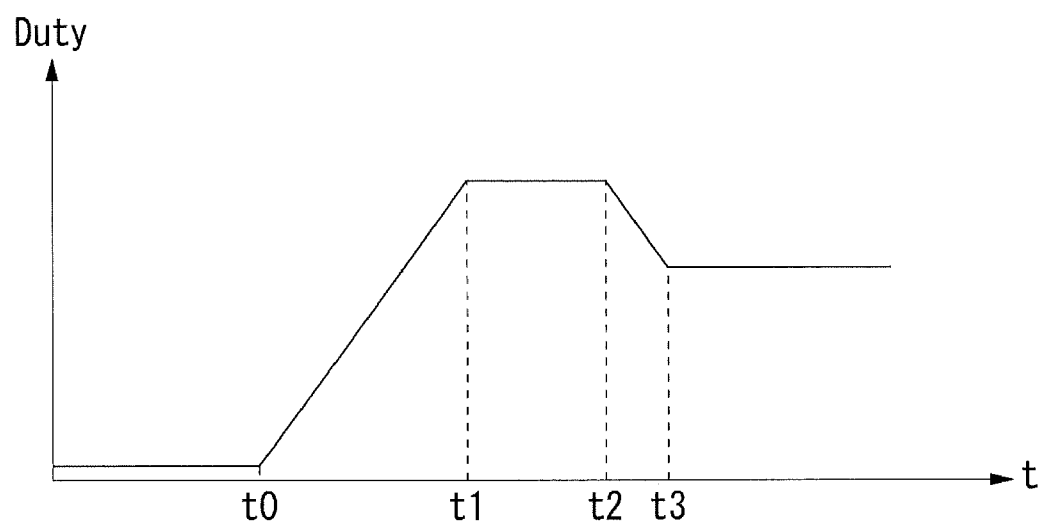
FIG. 14 is a time chart showing an example of control of a duty ratio that can be realized by the motor drive circuit of FIG. 13.

FIG. 14 shows an example of control of a duty ratio that can be realized by the motor drive circuit 100c according to the fifth embodiment. In FIG. 14, a time period from time t0 to t1 is set to a duty ratio corresponding to a first startup control voltage Vstrt1, a time period from time t1 to t2 is set to a duty ratio corresponding to the reference voltage Vref, a time period from time t2 to t3 is set to a duty ratio corresponding to a second startup control voltage Vstrt2, and after time t3 a setting is made to a duty ratio corresponding to a rotation control voltage Vcnt.

According to the present embodiment, by generating a pulse signal (Vpsm2) with a fixed duty ratio, and combining with other pulse signals, at startup time of the motor, before setting a target torque, it is possible to rotate at a constant torque for a constant time period.

Furthermore, startup control of a more complicated motor is possible, in accordance with setting of the reference voltage Vref, setting of a time constant of the time constant circuit 10, gain of the amplifier 20, and the like.

The abovementioned embodiment is an example, and a person skilled in the art will understand that various modified examples in combinations of various component elements and various processes thereof are possible, and that such modified examples are within the scope of the present invention.

For example, in the present embodiment, an explanation has been given concerning cases in which one amplifier 20 is used; however, more than one amplifier may be provided, a third and fourth startup control voltage Vstrt may be generated, and duty ratios may be set. In these cases, more complicated torque control is possible.

Moreover, in the embodiment, an explanation has been given concerning cases in which the amplifier 20 is configured as a inverting amplifier; however, there is no limitation thereto, and a configuration as a noninverting amplifier is also possible. In these cases, it is possible to increase the duty ratios of the PWM signals at a two-stage speed.

In the motor drive circuit according to the embodiment, an explanation has been given concerning cases in which the time constant circuit changes the first startup control voltage Vstrt1 when the motor is started up; however, the first startup control voltage Vstrt1 may be gradually decreased also at stop time. In these cases, it is possible to flexibly control the torque when the motor is stopped.

Furthermore, in the embodiment, an explanation has been given of cases in which the motor drive circuits 100a to 100c are integrated as a unit on one LSI, but there is no limitation thereto, and part of the component elements may be arranged outside the LSI as discrete elements or as chip parts, or a configuration may be made of a plurality of LSIs. For example, the H-bridge circuit 110 may be configured using discrete power transistors, and the motor drive circuits 100a to 100c may be embedded.

Furthermore, regarding the transistors used in the embodiment, a bipolar transistor and an FET may be mutually substituted, and a configuration may be such that a P-channel and an N-channel transistor are substituted.

In the embodiment, an explanation has been given concerning cases in which a single-phase motor is driven, but the present invention is not limited thereto. That is, the present invention may also be applied to a motor drive circuit which drives a three-phase motor or the like.

In the embodiment, an explanation has been given concerning cases in which the motor drive circuits 100a to 100c drive a fan motor, but a motor that is to be driven by the motor drive circuits according to the present invention is not limited to the fan motor, and may be widely applied to other single-phase and polyphase motors.

In the circuits explained in the embodiment, setting of a logical value of a signal at a high level and a low level is an example, and it is possible to freely make changes by appropriate inversion, by an inverter or the like. In addition, in accordance with this, substituting an AND gate or an OR gate can be easily envisaged by a person skilled in the art.

While the preferred embodiments of the present invention have been described using specific terms, such description is for illustrative purposes only, and it is to be understood that changes and variations may be made without departing from the spirit or scope of the appended claims.

The invention claimed is:

1. A motor drive circuit which supplies a drive signal to an output stage including at least two pairs of transistors, wherein a transistor pair includes a high side transistor and a low side transistor connected in series between a power supply voltage terminal and a ground terminal, and which supplies a switching voltage to a coil of a motor that is to be driven, the motor drive circuit comprising:
    a drive signal generation circuit which generates a drive signal that controls ON and OFF states of the output stage transistors in accordance with a target value of torque of the motor; and
    a driver circuit which alternately turns ON and OFF the high side transistors and the low side transistors of the output stage, based on the drive signal outputted from the drive signal generation circuit; wherein,
    when an instruction is issued to stop the motor, the driver circuit immediately turns OFF one of either the high side transistors or the low side transistors of the transistor pairs, and, after a predetermined delay time has elapsed, turns OFF another of either the high side transistors or the low side transistors of the transistor pairs.

2. A motor drive circuit according to claim 1, wherein the driver circuit controls the another of either the high side transistors or the low side transistors, based on the drive signal, during the delay time.

3. A motor drive circuit according to claim 1, wherein the driver circuit forcibly turns ON the another of either the high side transistors or the low side transistors, during the delay time.

4. A motor drive circuit according to claim 1, wherein the driver circuit comprises:
    a timing signal generation circuit, which receives a stop signal that instructs the motor to stop, and which outputs a first timing signal and a second timing signal, of a predetermined level, at different timing shifted by the delay time;
    a first combining circuit which is arranged on a path of a high side drive signal supplied from the drive signal generation circuit to the high side transistors, which logically combines the high side drive signal with the first timing signal, and which forcibly turns OFF the high side transistors, in a time period in which the first timing signal has a predetermined level; and
    a second combining circuit which is arranged on a path of a low side drive signal supplied from the drive signal generation circuit to the low side transistors, which logically combines the low side drive signal with the second timing signal, and which forcibly turns OFF the low side transistors, in a time period in which the second timing signal has a predetermined level.

5. A motor drive circuit according to claim 4, wherein
    the timing signal generation circuit, after the delay time has elapsed from setting the first timing signal at the predetermined level, sets the second timing signal at the predetermined level, and
    the second combining circuit sets ON and OFF states of the low side transistors, during the delay time, based on the low side drive signal.

6. A motor drive circuit according to claim 4, wherein
    the timing signal generation circuit, after the delay time has elapsed from setting the second timing signal at the predetermined level, sets the first timing signal at the predetermined level, and
    the first combining circuit sets ON and OFF states of the high side transistors, during the delay time, based on the high side drive signal.

7. A motor drive circuit according to claim 4, wherein
    the timing signal generation circuit, after the delay time has elapsed from setting the first timing signal at the predetermined level, sets the second timing signal at the predetermined level, and
    the second combining circuit forcibly turns ON the low side transistors, during the delay time.

8. A motor drive circuit according to claim 4, wherein
    the timing signal generation circuit, after the delay time has elapsed from setting the second timing signal at the predetermined level, sets the first timing signal at the predetermined level, and
    the first combining circuit forcibly turns ON the high side transistors, during the delay time.

9. A motor drive circuit according to claim 2, further comprising a stop signal generation circuit which monitors a state of the motor, goes to a predetermined level when a predetermined condition is fulfilled, and generates a stop signal instructing the motor to stop.

10. A motor drive circuit according to claim 9, wherein the stop signal generation circuit monitors temperature of the motor, and when the temperature deviates from a predetermined temperature range, puts the stop signal to the predetermined level.

11. A motor drive circuit according to claim 9, wherein the stop signal generation circuit monitors a rotation state of the motor, and when rotation is not possible, puts the stop signal at the predetermined level.

12. A motor drive circuit according to claim 9, wherein the stop signal generation circuit detects current flowing in a coil of the motor, and when the detected current exceeds a predetermined value, puts the stop signal at the predetermined level.

13. A motor drive circuit according to claim 1, wherein the motor drive circuit is integrated as a unit on one semiconductor substrate.

14. A cooling device comprising:
a fan motor; and
the motor drive circuit according to claim 1, which drives the fan motor.

15. A motor drive method of supplying a drive signal to an output stage including at least two pairs of transistors, wherein a transistor pair includes a high side transistor and a low side transistor connected in series between a power supply voltage terminal and a ground terminal, and of supplying a switching voltage to a coil of a motor that is to be driven, the motor drive method comprising:
generating a drive signal which controls ON and OFF states of the output stage transistors in accordance with a target value of torque of the motor;
alternately turning ON and OFF the high side transistors and the low side transistors of the output stage, based on the generated drive signal;
generating a stop signal which instructs the motor to stop; and
immediately turning OFF one of either the high side transistors or the low side transistors of the transistor pairs, when an instruction is issued to stop the motor, and, after a predetermined delay time has elapsed, turning OFF another of either the high side transistors or the low side transistors of the transistor pairs.

16. A motor drive circuit which generates a pulse-modulated drive signal that defines conduction time of a coil of a motor that is to be driven, and controls number of rotations of the motor, the motor drive circuit comprising:
a time constant circuit which, when the motor is started up, generates a first startup control voltage in which voltage value changes with time;
an amplifier which amplifies the first startup control voltage outputted from the time constant circuit, and outputs the amplified voltage as a second startup control voltage; and
a drive signal generation circuit which combines rotation control voltage, set according to a target value of torque of the motor, with the first and the second startup control voltages, and generates a pulse-modulated drive signal that has a duty ratio corresponding to any of the three voltages.

17. A motor drive circuit according to claim 16, wherein the amplifier is a variable gain amplifier.

18. A motor drive circuit according to claim 16, wherein the amplifier is an inverting amplifier which performs inverting amplification of the first startup control voltage.

19. A motor drive circuit according to claim 16, wherein the amplifier is a noninverting amplifier which performs noninverting amplification of the first startup control voltage.

20. A motor drive circuit according to claim 16, wherein the drive signal generation circuit comprises:
a pulse-modulation comparator which generates a pulse-modulation signal by comparing the rotation control voltage with a predetermined cyclic voltage;
a first comparator which generates a first control pulse signal by comparing the first startup control voltage with the cyclic voltage;
a second comparator which generates a second control pulse signal by comparing the second startup control voltage with the cyclic voltage; and
a combining circuit which generates the drive signal by combining the pulse-modulation signal with the first and the second control pulse signals by a logical operation.

21. A motor drive circuit according to claim 20, wherein the combining circuit comprises:
a first logic block which performs a logical operation on the pulse-modulation signal generated by the pulse-modulation comparator, with the second control pulse signal generated by the second comparator; and
a second logic block which combines the first control pulse signal generated by the first comparator with an output signal of the first logic block.

22. A motor drive circuit according to claim 16, wherein the drive signal generation circuit comprises:
a voltage selection circuit which selects a voltage among any of three voltages, based on a level relationship of the rotation control voltage, the first and the second control voltage; and
a pulse-width modulation comparator which generates the drive signal that is pulse-modulated, by comparing voltage outputted from the voltage selection circuit, and a predetermined cyclic voltage.

23. A motor drive circuit according to claim 16, wherein the motor drive circuit is integrated as a unit on one semiconductor substrate.

24. A cooling device comprising:
a fan motor; and
the motor drive circuit according to claim 16, which drives the fan motor.

25. A motor drive method of generating a pulse-modulated drive signal that defines conduction time of a coil of a motor that is to be driven, and of controlling number of rotations of the motor, the method comprising:
generating a first startup control voltage in which voltage value changes with time, when the motor is started up;
amplifying the first startup control voltage and outputting the amplified voltage as a second startup control voltage; and
combining rotation control voltage, set according to a target value of torque of the motor, with the first and the second startup control voltages, and generating a pulse-modulated drive signal that has a duty ratio corresponding to any of the three voltages.

* * * * *